US011962269B2

(12) United States Patent
Creasy et al.

(10) Patent No.: US 11,962,269 B2
(45) Date of Patent: Apr. 16, 2024

(54) LOW-PROFILE BACKRAIL MODULE CLAMP

(71) Applicant: ARRAY TECHNOLOGIES, INC., Albuquerque, NM (US)

(72) Inventors: Lucas Creasy, Scottsdale, AZ (US); Nathan Schuknecht, Golden, CO (US); Benjamin C. de Fresart, Albuquerque, NM (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 17/805,010

(22) Filed: Jun. 1, 2022

(65) Prior Publication Data

US 2022/0294386 A1 Sep. 15, 2022

Related U.S. Application Data

(63) Continuation-in-part of application No. 17/652,440, filed on Feb. 24, 2022.

(60) Provisional application No. 63/228,261, filed on Aug. 2, 2021, provisional application No. 63/153,326, filed on Feb. 24, 2021.

(51) Int. Cl.
*H02S 30/00* (2014.01)
*B21D 28/26* (2006.01)
*B25B 5/16* (2006.01)
*H02S 20/32* (2014.01)

(52) U.S. Cl.
CPC .............. *H02S 30/00* (2013.01); *B21D 28/26* (2013.01); *B25B 5/16* (2013.01); *H02S 20/32* (2014.12)

(58) Field of Classification Search
CPC .......... H02S 30/10; H02S 20/32; H02S 30/00; F16B 2/06; F16M 13/02; F24S 2025/80; F24S 2025/802; F24S 2025/804; F24S 25/634; F24S 2025/6003; B21D 28/26; B25B 5/16; F16L 3/14; F16L 3/233; F16L 3/24; Y02E 10/47
USPC ......................................................... 136/243
See application file for complete search history.

(56) References Cited

U.S. PATENT DOCUMENTS

| 10,622,937 | B2 * | 4/2020 | Pesce | H02S 20/30 |
| 2012/0001041 | A1 * | 1/2012 | Yang | H05K 5/0204 |
| | | | | 248/219.4 |
| 2015/0187975 | A1 * | 7/2015 | Wares | H02S 20/32 |
| | | | | 136/246 |

(Continued)

OTHER PUBLICATIONS

International Search Report and Written Opinion issued in PCT Application No. PCT/US2023/024202 dated Aug. 8, 2023; 11 pages.

*Primary Examiner* — Christopher Garft
(74) *Attorney, Agent, or Firm* — MASCHOFF BRENNAN

(57) ABSTRACT

A method of forming a module clamp of a photovoltaic module support structure may include cutting a folding pattern into a sheet of metal. The folding pattern may include one or more width-wise slits relative to the sheet of metal, one or more length-wise slits relative to the sheet of metal, and a hole. The method may include stamping one or more first features onto the sheet of metal to form a stamped sheet and folding the stamped sheet along the one or more width-wise slits and the one or more length-wise slits to form a preliminary module clamp. The method may include stamping one or more second features onto the preliminary module clamp to form the module clamp.

16 Claims, 34 Drawing Sheets

(56) References Cited

U.S. PATENT DOCUMENTS

| | | | |
|---|---|---|---|
| 2015/0200621 A1* | 7/2015 | Reed | F24S 25/636 |
| | | | 29/525.01 |
| 2016/0261227 A1* | 9/2016 | Wares | F24S 25/20 |
| 2017/0250648 A1* | 8/2017 | Haas | F24S 25/65 |
| 2017/0294869 A1* | 10/2017 | Pesce | F24S 30/425 |
| 2020/0076360 A1 | 3/2020 | Watson et al. | |
| 2020/0153382 A1* | 5/2020 | Ballentine | F24S 25/636 |
| 2020/0162016 A1 | 5/2020 | Corio | |
| 2020/0248930 A1 | 8/2020 | Kimble | |
| 2021/0180832 A1* | 6/2021 | Schuknecht | F24S 25/634 |
| 2021/0351738 A1* | 11/2021 | Schuknecht | F16B 5/0024 |
| 2021/0359640 A1* | 11/2021 | Schuknecht | F16M 13/022 |
| 2022/0224284 A1* | 7/2022 | Zimmermann | H02S 20/30 |
| 2022/0271707 A1* | 8/2022 | Reynolds | F24S 25/63 |

* cited by examiner

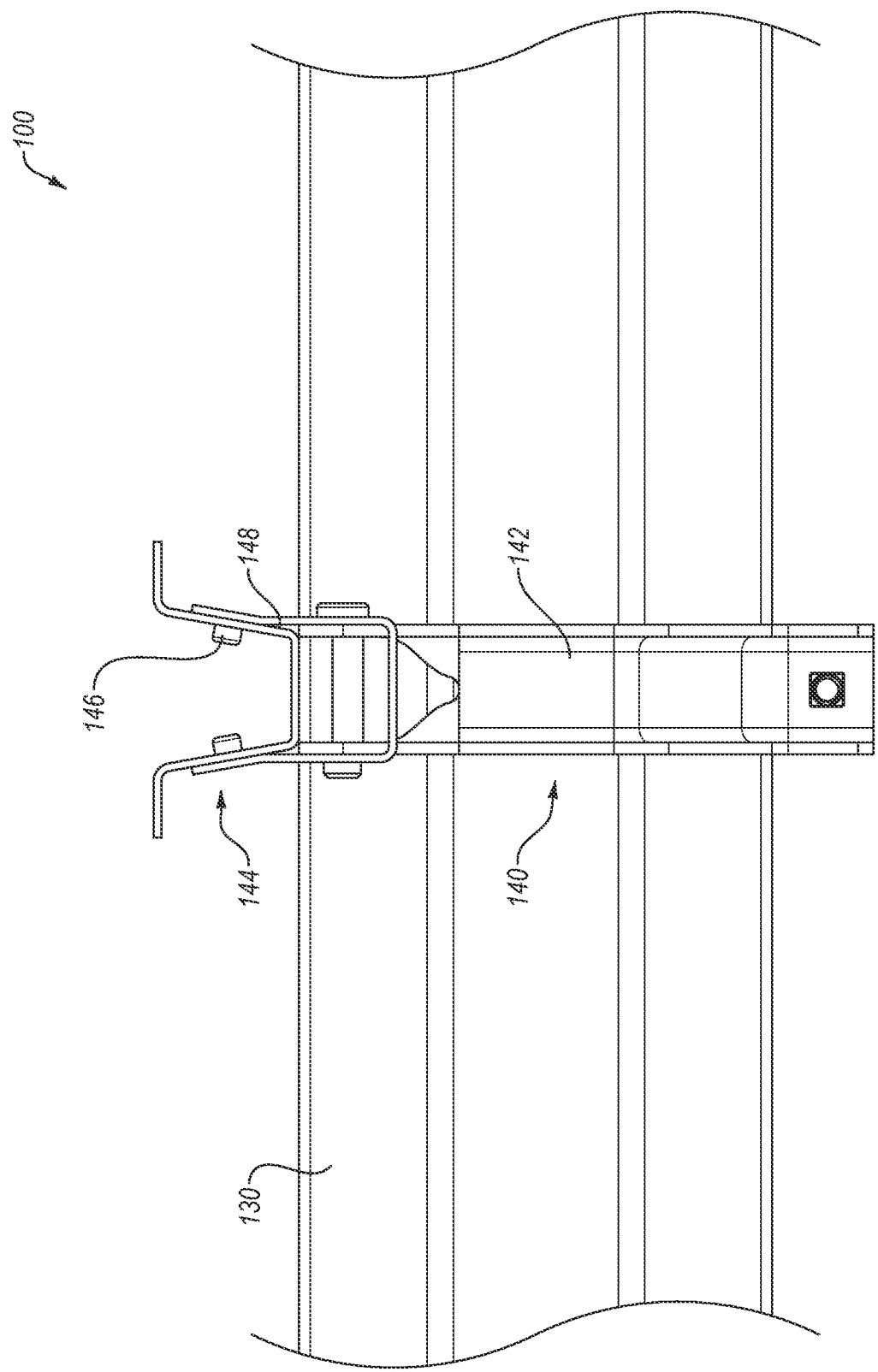

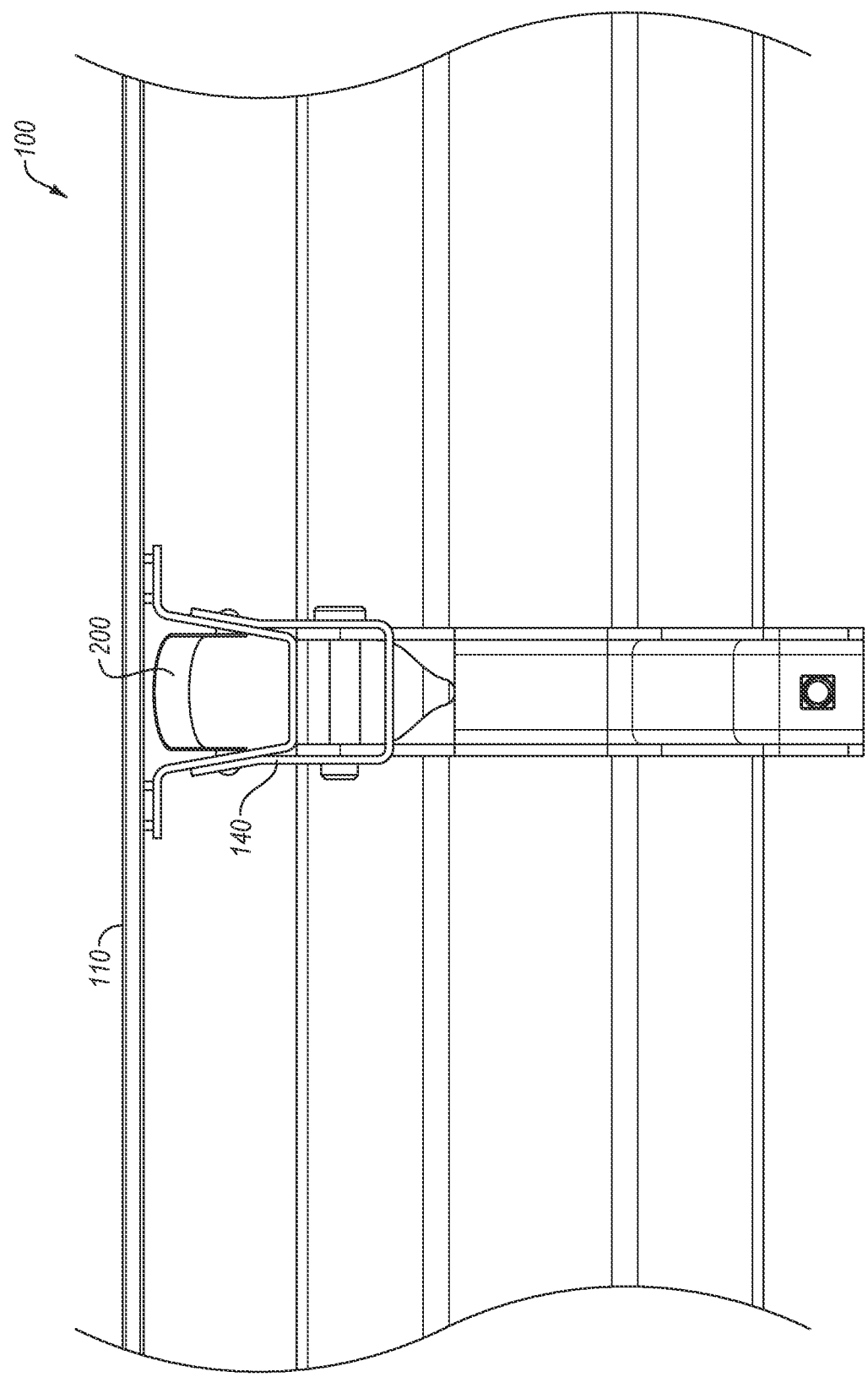

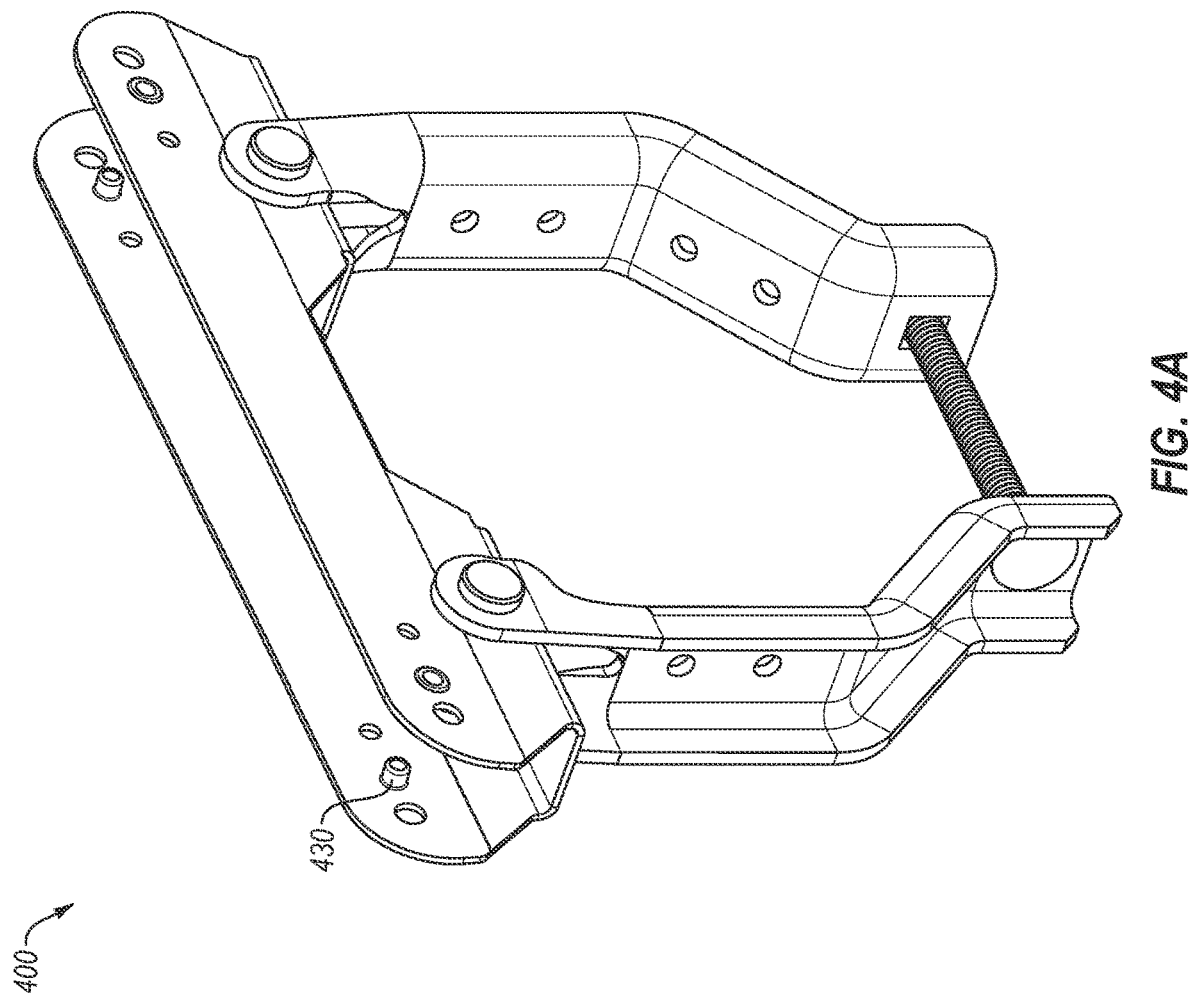

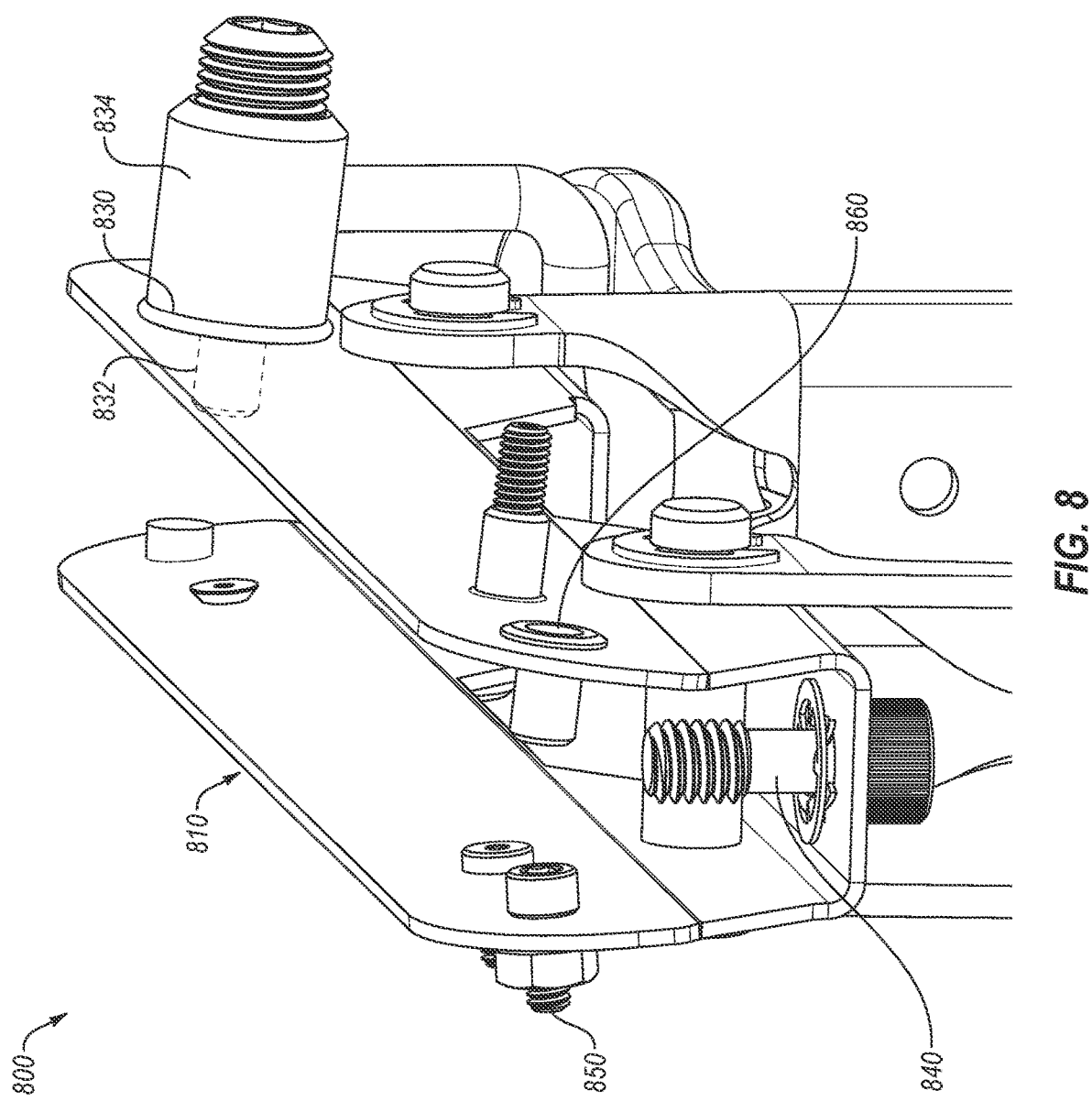

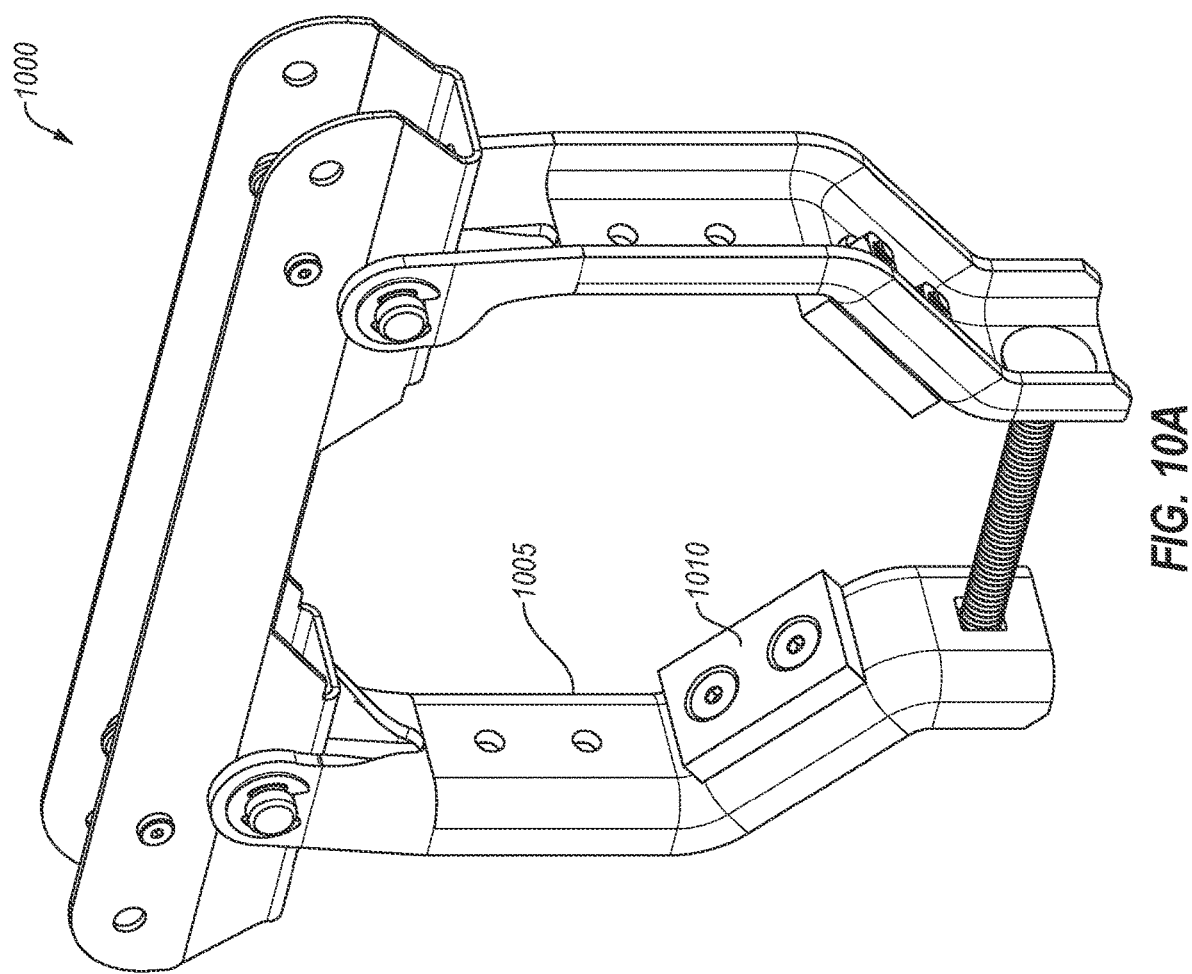

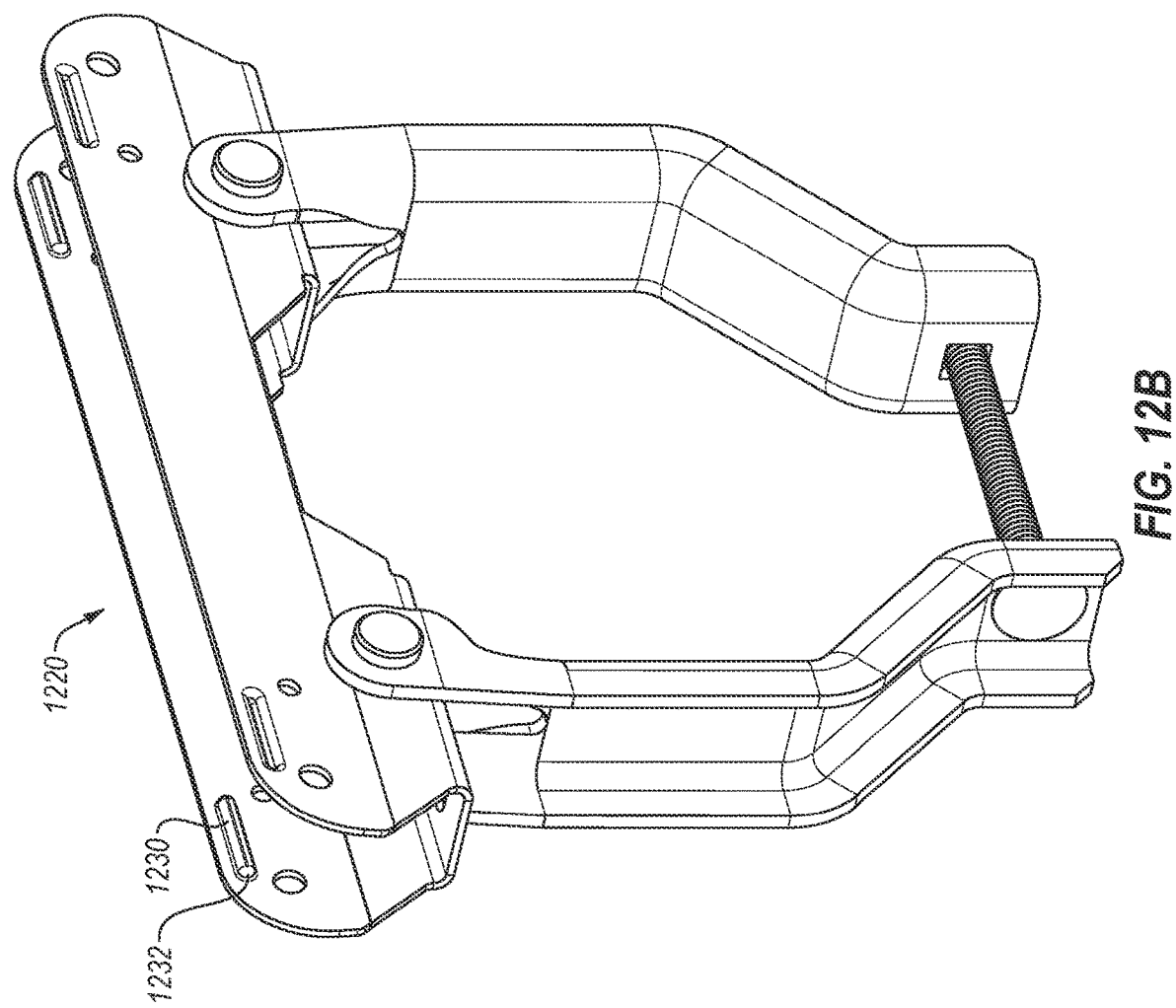

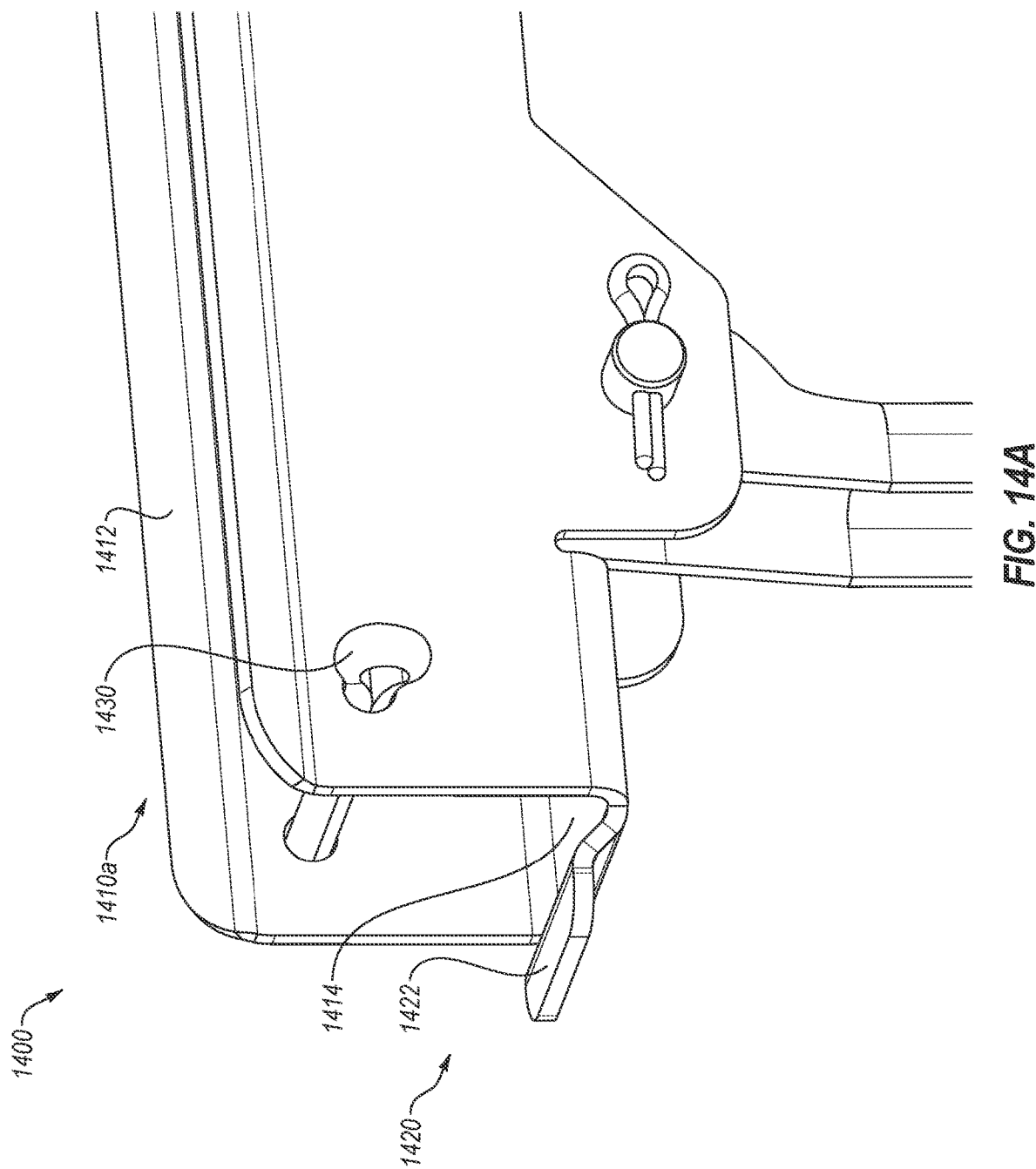

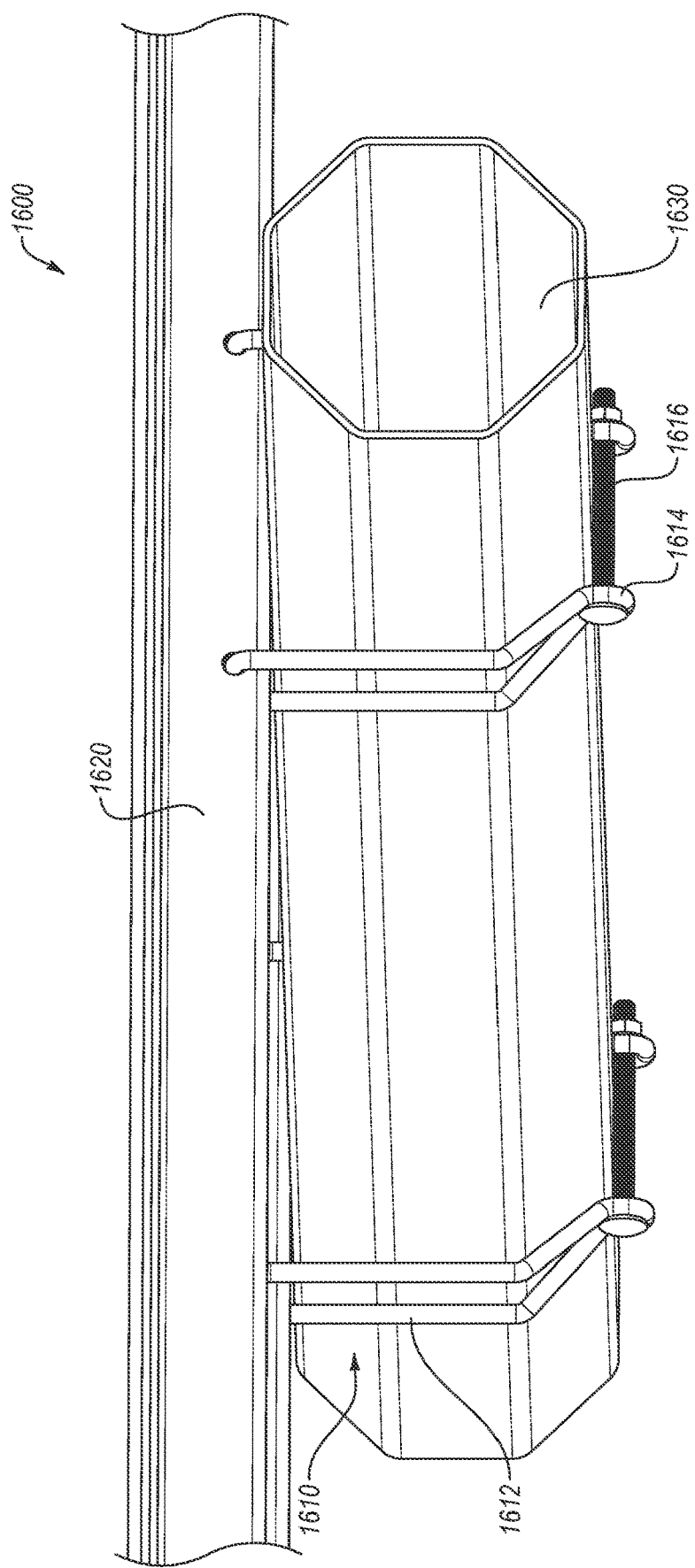

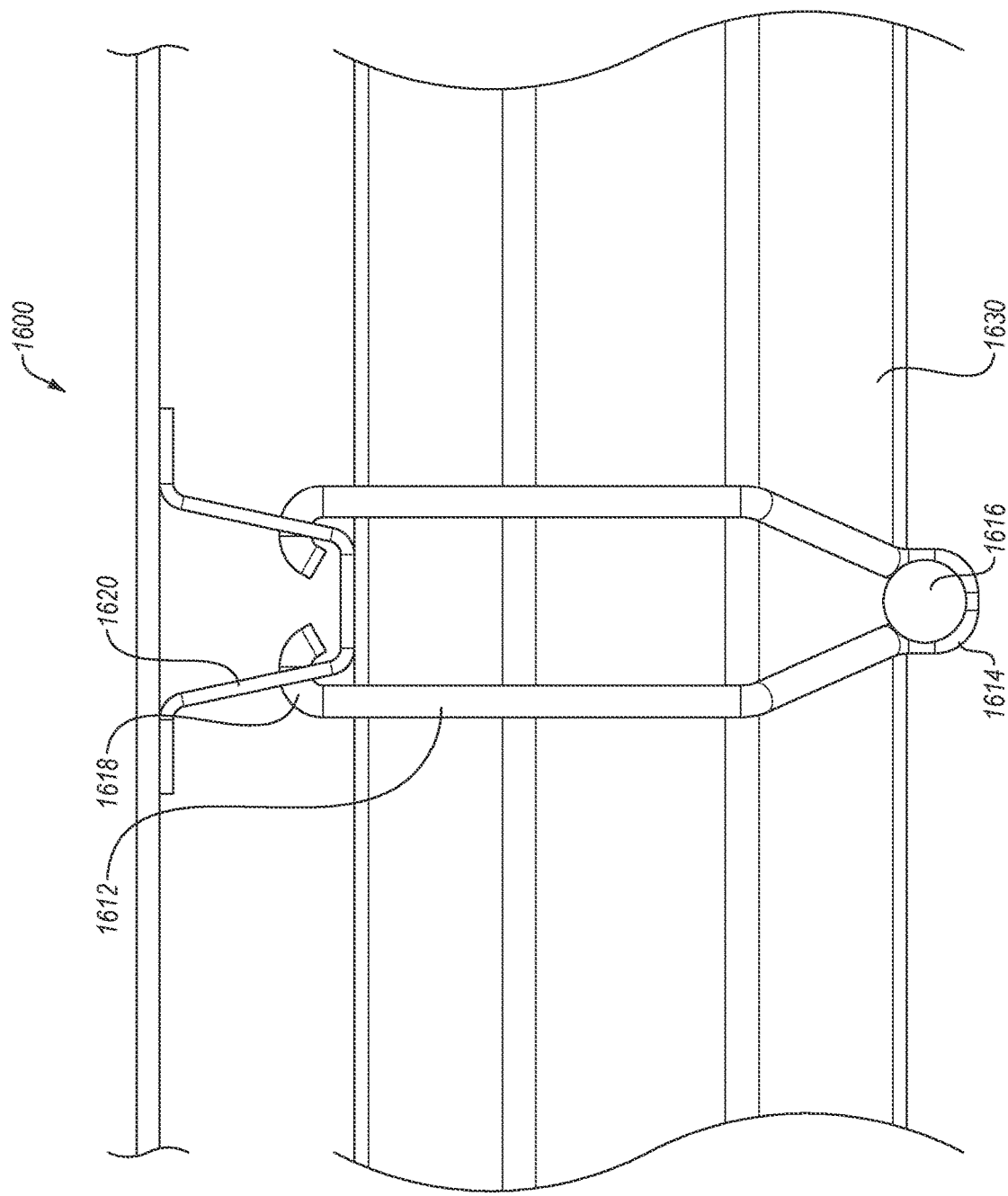

LOW-PROFILE BACKRAIL MODULE CLAMP

CROSS-REFERENCE TO RELATED APPLICATION

This application is a continuation-in-part application that claims the benefit of U.S. patent application Ser. No. 17/652,440, filed on Feb. 24, 2022, which claims the benefit of U.S. Patent Application Ser. No. 63/228,261, filed on Aug. 2, 2021, and U.S. Patent Application Ser. No. 63/153,326, filed on Feb. 24, 2021; the disclosures of which are incorporated herein by reference in their entireties.

FIELD OF THE INVENTION

The present disclosure generally relates to a low-profile backrail module clamp.

BACKGROUND

Systems of solar panels may include one or more PV modules. The PV modules may be mounted in rows on solar trackers that direct an orientation of the PV modules such that the orientation of the PV modules changes throughout a day. The PV modules may be placed in an outdoor location such that the PV modules may receive sunlight with little or no obstruction.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method of forming a module clamp of a photovoltaic module support structure may include cutting a folding pattern into a sheet of metal. The folding pattern may include one or more width-wise slits relative to the sheet of metal, one or more length-wise slits relative to the sheet of metal, and a hole. The method may include stamping one or more first features onto the sheet of metal to form a stamped sheet and folding the stamped sheet along the one or more width-wise slits and the one or more length-wise slits to form a preliminary module clamp. The method may include stamping one or more second features onto the preliminary module clamp to form the module clamp.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 1B is a side view of the example embodiment of the snap-lock PV module mounting system;

FIG. 1C is the side view of the example embodiment of the snap-lock PV module mounting system including the PV module mounted on top of the module clamps and a spring clip according to at least one embodiment of the present disclosure;

FIG. 4A is an isometric view of a second example embodiment of a module clamp with insertion pegs according to at least one embodiment of the present disclosure;

FIG. 8 is an isometric view of a sixth example embodiment of the module clamp with a spring-loaded protrusion according to at least one embodiment of the present disclosure;

FIG. 10A is an isometric view of a seventh example embodiment of the module clamp according to at least one embodiment of the present disclosure;

FIG. 12B is an isometric view of the eighth example embodiment of the module clamp according to at least one embodiment of the present disclosure;

FIGS. 14A and 14B are close-up views of a tenth and an eleventh example embodiment of the module clamp according to at least one embodiment of the present disclosure;

FIG. 16A is an isometric view of a thirteenth example embodiment of the module clamp coupled to a torque tube according to at least one embodiment of the present disclosure;

FIG. 16C is a side view of the module clamp coupled to the torque tube according to at least one embodiment of the present disclosure;

DETAILED DESCRIPTION

The present disclosure relates to the mounting of PV modules to support structure, such as that used to facilitate tracking of the sun via the PV modules. For example, PV modules may be mounted through a variety of hardware or other structural components to a torque tube or other device for varying the orientation of the PV modules to track the sun as it progresses across the sky. In some circumstances, the PV modules may be mounted to one or more rails running along a back side of the PV module(s).

Additionally or alternatively, the present disclosure relates to, among other things, a module clamp that is configured to interface with a module rail coupled to a photovoltaic (PV) module and/or one or more components of a PV module support structure, such as a torque tube or a torque tube frame, so as to connect the PV module to the rest of the PV module support structure. The module clamp may be a low-profile backrail module clamp that includes a jog feature offsetting one or more of the vertical walls of the module clamp. In some embodiments, the jog feature may facilitate improved slot alignment for interfacing with the module rail and/or other components of the PV module support structure.

The module clamp according to the present disclosure may provide a number of advantages over existing module clamps. For example, the module clamp may be fabricated in higher volumes than existing module clamps or similar components because the module clamp may be efficiently formed using a stamping process with a rectangular or substantially rectangular material sheet. Additionally or alternatively, the module clamp may provide improved alignment with and/or reduced force on other PV module support structure components, which may increase the longevity of the PV module support structure and reduce component and replacement costs associated with such support structures.

Embodiments of the present disclosure are explained with reference to the accompanying figures.

Figure 1A:
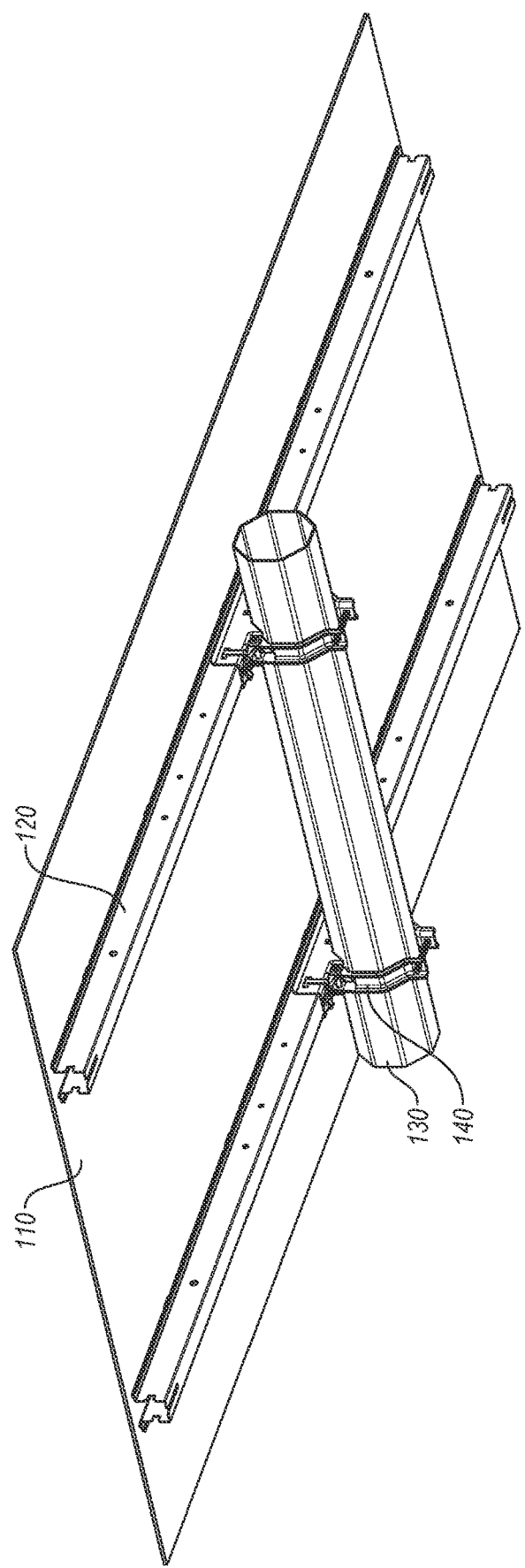
FIG. 1A is an isometric view of an example embodiment of a snap-lock PV module mounting system including a PV module mounted on top of one or more module clamps according to at least one embodiment of the present disclosure.

FIGS. 1A and 1B illustrate different views of an example embodiment of a snap-lock PV module mounting system 100. FIG. 1A is an isometric view of an example embodiment of a snap-lock PV module mounting system 100 including a PV module 110 mounted on top of one or more module clamps 140 according to at least one embodiment of the present disclosure. FIG. 1B is a side view of the example embodiment of the snap-lock PV module mounting system 100, and FIG. 1C is the side view of the example embodiment of the snap-lock PV module mounting system 100 including the PV module 110 mounted on top of the module clamps 140.

The snap-lock PV module mounting system 100 may include a PV module 110 that includes one or more module rails 120. Each of the module rails 120 may interface with one of the module clamps 140 such that the module rails 120 are attached and/or fixed to the module clamps 140. The module clamps 140 may circumscribe a module support structure 130 (e.g., a torque tube as illustrated) or attach to the module support structure 130 by another method such that the PV module 110 is coupled to the module support structure 130.

In some embodiments, the module clamps 140 may include a clamp band 142, a seating portion 144, and/or one or more protruding features 146. In some embodiments, the protruding features 146 may be positioned to extend from an interior surface of the seating portion 144, such as from lateral walls 148 of the seating portion 144. In some embodiments, the module rail 120 may be positioned over the module clamps 140 and set down into the seating portion 144 of the module clamps 140 during installation such that the module rail 120 is seated within the seating portion 144. Additionally or alternatively, the module rail 120 may be positioned in any way such that the module rail 120 may interface with the seating portion 144 of the module clamp 140. For example, the module rail 120 may be oriented in a horizontal (or any other) direction, such as by propping up the PV module 110, and the module rail 120 may be slotted into the seating portion 144 of the module clamp 140. As another example, the module rail may be oriented in an upward direction, and the seating portion 144 may be aligned and set onto the module rail 120 from above.

In some embodiments, one or more lateral walls of the seating portion 144 may be angled such that placing the module rail 120 in the seating portion 144 and/or placing the seating portion 144 onto the module rail 120 pushes or flexes the lateral walls of the seating portion 144 outward as the module rail is pressed downwards into the seating portion 144 towards the module support structure 130. In some embodiments, the module rail 120 may include one or more openings into which the protruding features 146 may interface after the module rail 120 has been pushed a sufficient distance into the seating portion 144. The protruding features 146 interfacing with the openings of the module rail 120 may cause or allow the lateral walls of the seating portion 144 to contract back towards their original positions and lock the module rail 120 in place, which may fix the position of the PV module 110 relative to the module support structure 130. For example, such pushing outward or flexion of the lateral walls of the seating portion 144 outward may be an elastic deformation of the lateral walls of the seating portion 144 such that they may be biased towards their original position and may move back towards their original position when the protruding features 146 align with holes in the module rail 120.

In some embodiments, the seating portion 144 may be sized and/or positioned and/or the protruding features 146 may be positioned such that the module rail 120 is positioned against the module support structure 130 when fully seated in the seating portion 144.

Figure 2:
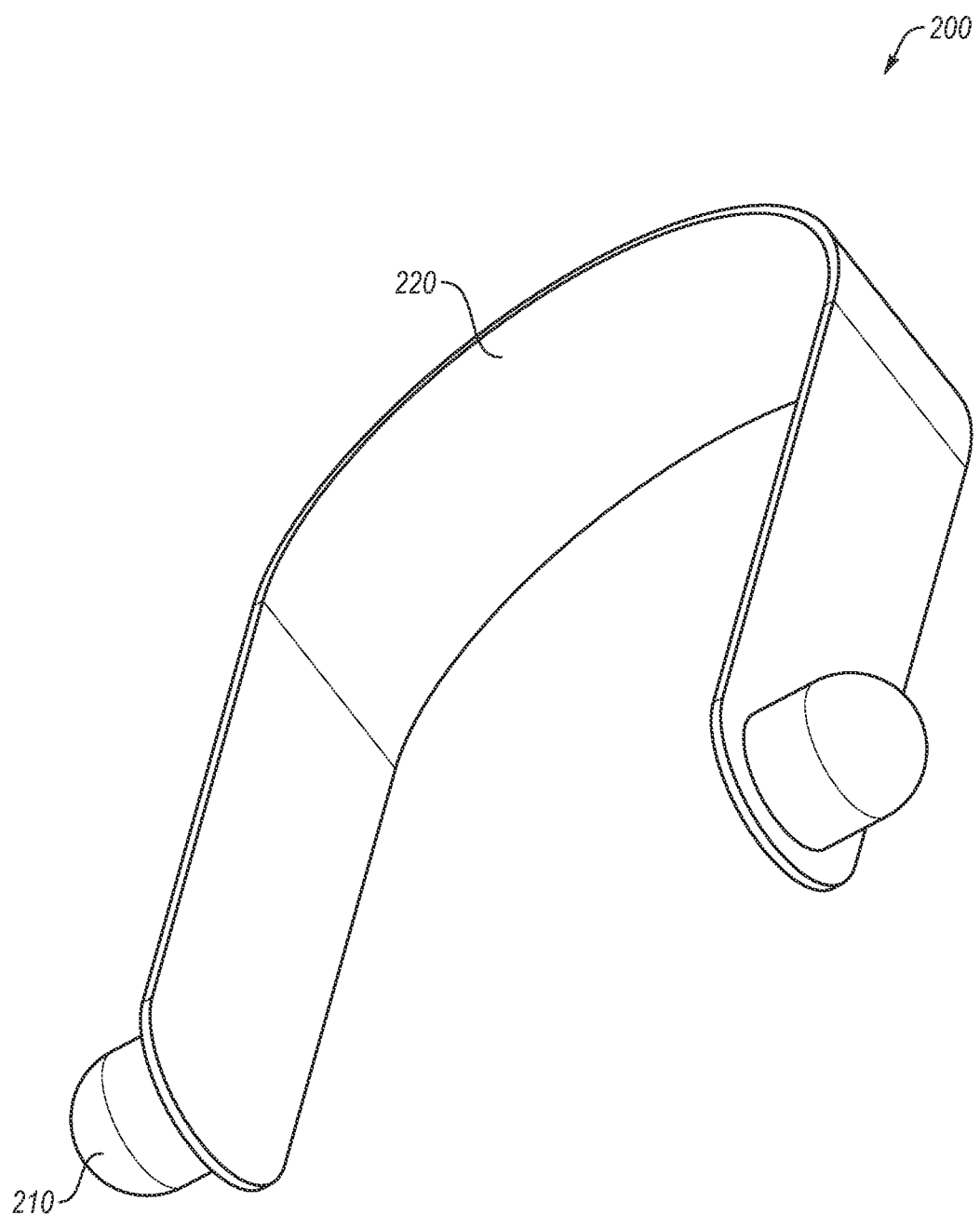
FIG. 2 is a diagram of a spring clip that may be installed within a PV module frame according to at least one embodiment of the present disclosure.

In some embodiments, a spring clip 200 may be used in conjunction with the module clamp 140. FIG. 1C is the side view of the example embodiment of the snap-lock PV module mounting system 100 including the PV module 110 mounted on top of the module clamp 140 in which the module clamp 140 includes the spring clip 200 according to at least one embodiment of the present disclosure. FIG. 2 is a diagram of a spring clip 200 that may be installed within a PV module frame and/or a module rail (such as the module rail 120) according to at least one embodiment of the present disclosure. The spring clip 200 may include one or more protruding features 210 coupled to a clip band 220. In some embodiments, the spring clip 200 may be attached to or disposed within the PV module frame and/or the module rail with the protruding features 210 on the spring clip 200 extending beyond the PV module frame and/or module rail.

In these and other embodiments, the clip band 220 may be compressed as the PV module frame/rail is positioned against a module clamp (e.g., seated within the seating portion 144 of the module clamp 140). In these and other embodiments, the lateral walls of the module clamp may include one or more openings corresponding to the position and/or size of the protruding features 210 of the spring clip 200. As such, the clip band 220 may be compressed until the protruding features 210 are aligned and interface with the openings in the lateral walls of the module clamp, in which circumstance the spring force of the clip band 220 from being compressed may cause the protruding features 210 to spring back outward into the holes. Such an interaction may lock the position of the spring clip 200 relative to the module clamp, thereby also locking the PV module frame/rail relative to the module clamp.

Figure 3A:
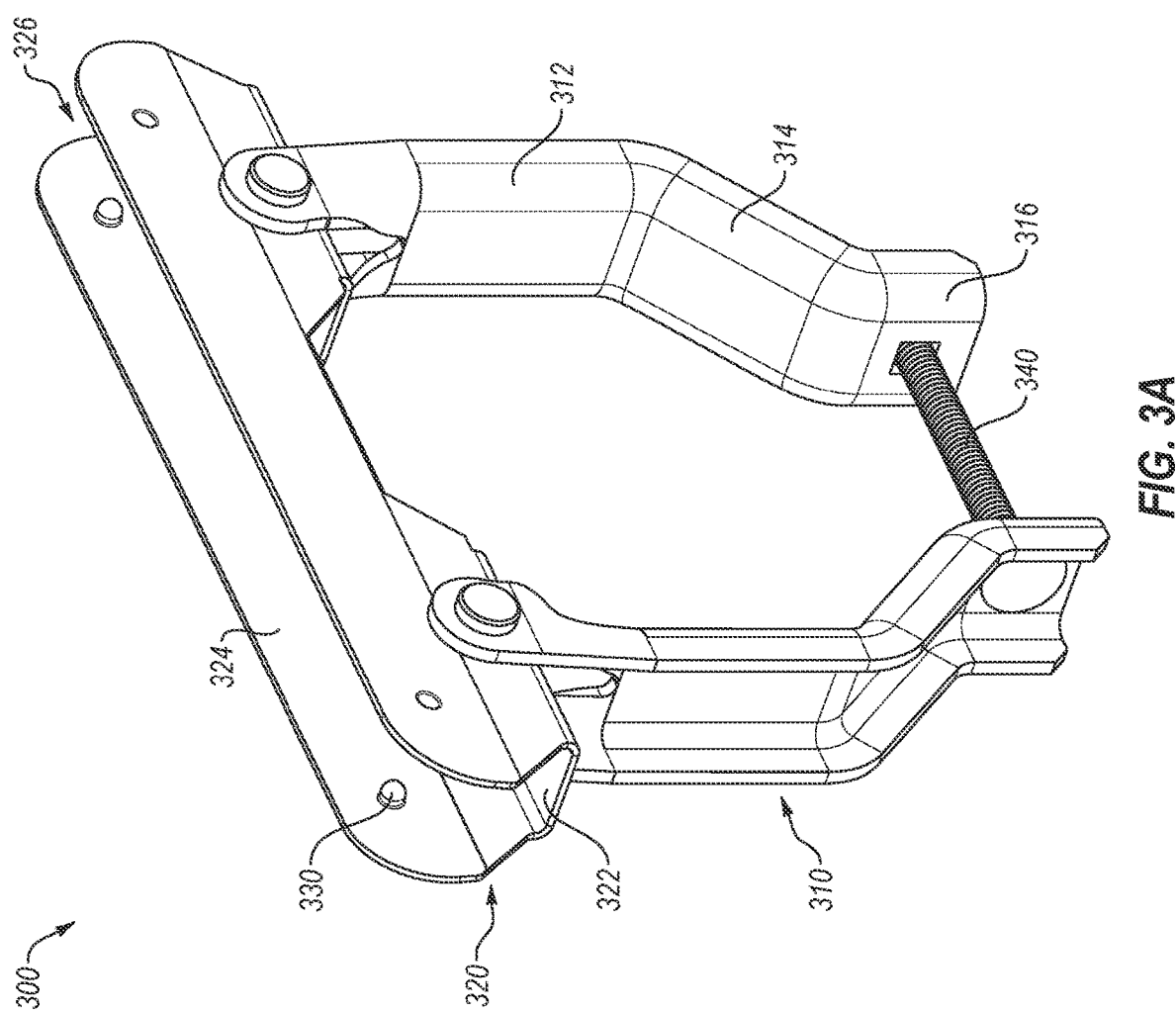
FIG. 3A is an isometric view a first example embodiment of a module clamp of the snap-lock PV module mounting system including a seating portion with protruding nubs according to at least one embodiment of the present disclosure.
Figure 3C:
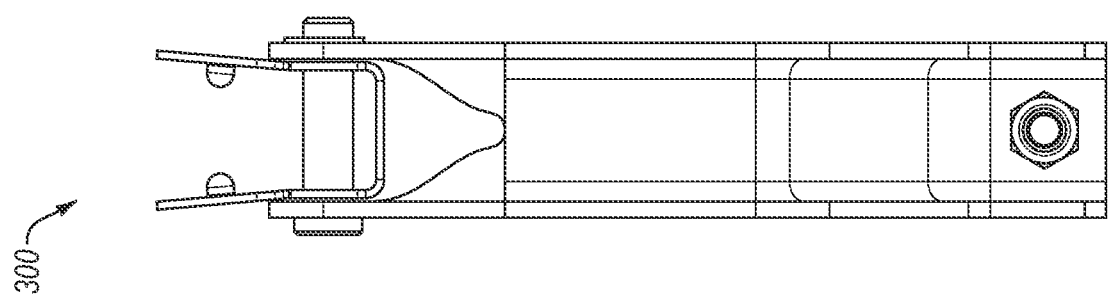
FIG. 3C is an end view of the first example embodiment of the module clamp.
Figure 3B:
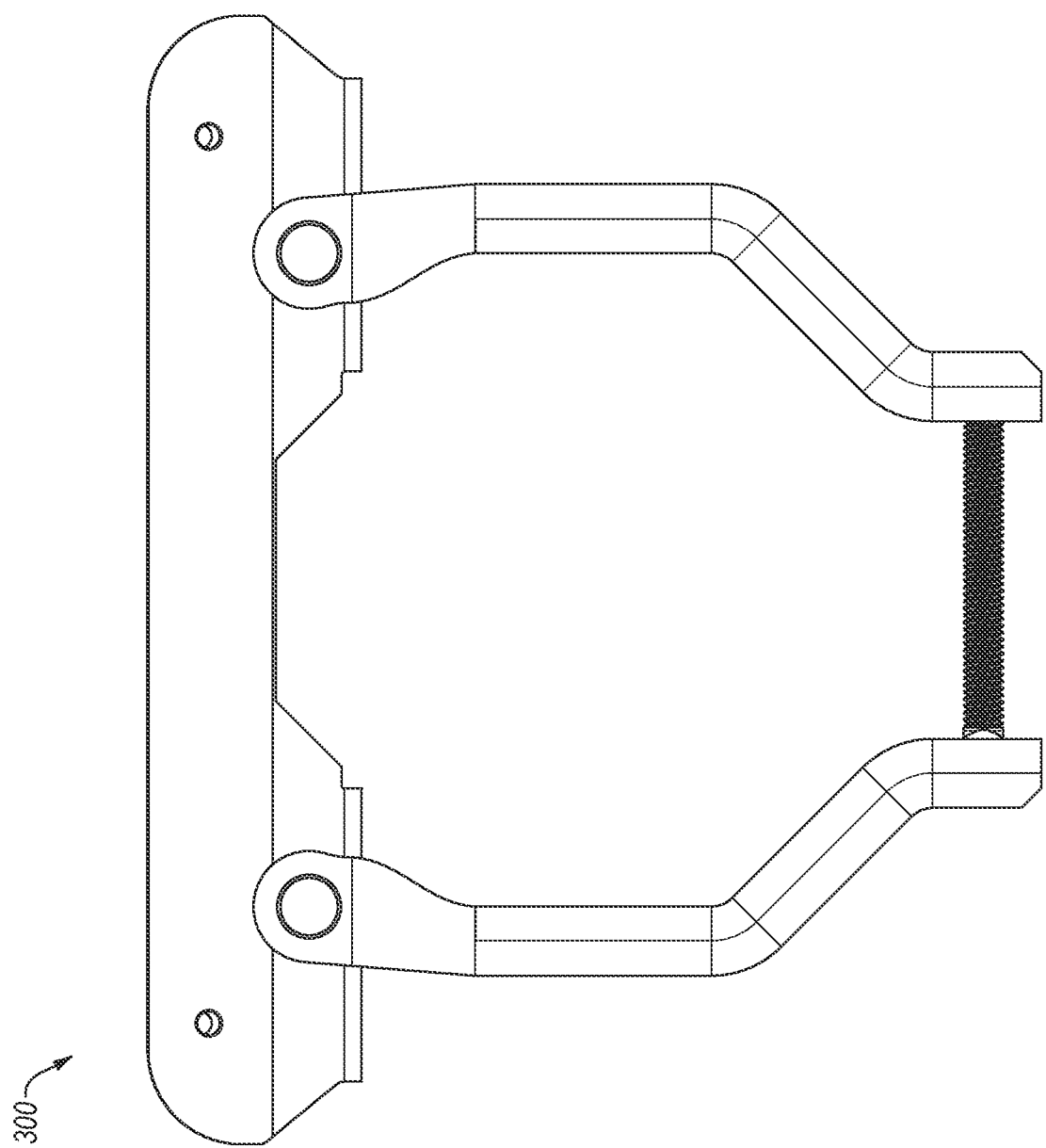
FIG. 3B is a side view of the first example embodiment of the module clamp.

FIG. 3A is an isometric view of an example embodiment of a module clamp 300 including a seating portion 320 with protruding nubs 330 according to at least one embodiment of the present disclosure. FIG. 3B is a side view of the second example embodiment of the module clamp 300, and FIG. 3C is an end view of the second example embodiment of the module clamp 300. The embodiments illustrated in FIGS. 3A-3C may operate in a similar manner to those described in reference to FIGS. 1A-1C, with a module rail being pressed into the module clamp to seat the module rail in the seating portion to lock the module rail (and the PV modules attached thereto) in place relative to the module clamp.

In some embodiments, the protruding nubs 330 may be a fastening feature made of a metal, such as cast iron, stainless steel, titanium, or aluminum, among others, and shaped by a sheet metal stamping process. For example, a circular, semicircular, or other shape may be stamped or punched into a sheet of metal used to create the seating area of the seating portion 320 with sufficient force to indent portions of the stamped shape inwards (e.g., such that the protruding nubs 330 are projecting inwards into the seating area of the seating portion 320) while keeping a portion of the shape still attached to the seating area of the seating portion 320.

The seating portion 320 of the module clamp 300 may be coupled to a clamp body 310 that is configured to interface with a torque tube. In some embodiments, the clamp body 310 may be made of one or more components that are shaped based on a shape of the torque tube with which the clamp body 310 is configured to interface. For example, the example of the clamp body 310 corresponding to a torque tube having an octangular cross-section illustrated in FIG. 3A may include a first body section 312 that corresponds to a straight edge of the octangular torque tube and a second body section 314 connected to the first body section 312 that corresponds to an angled edge of the octangular torque tube. In this and other examples, the example clamp body 310 may include a third body section 316 that is connected to the second body section 314 and is parallel to the first body section 312. A bolt, screw, or any other fastener 340 may be inserted through the third body sections 316 of two or more adjacent clamp body components to connect the clamp body components together via their respective third body sections 316 as illustrated in FIG. 3A. While illustrated as being parallel, it will be appreciated that the third portion may extend in any direction such that it does not interfere with the torque tube and provides a surface against which the fastener 340 may be tightened.

In some embodiments, a profile of the seating portion 320 may include a base surface 322 and two lateral walls 324. The base surface 322 may be a bottom of the seating portion 320 against which the module rail may be pressed when it is fully seated in the seating portion 320. Additionally or alternatively, when seated in the seating portion 320, the module rail may be some distance away from the base surface 322 despite being fully seated. In these and other embodiments, the base surface 322 may act as a stabilizing and connecting component between the two lateral walls 324. In some embodiments, the lateral walls 324 may include a generally vertical portion and a flared portion. The flared portion may make it easier for an installer to guide the module rail into the seating portion 320. Additionally or alternatively, the flared portion may facilitate flexion of the lateral walls 324 outwards when pushed outwards by the module rail interfering with the protruding nubs 330. In these and other embodiments, when the protruding nubs 330 are disposed on the flared portion, the protruding features may extend into the interior region 326 of the seating portion 320 (e.g., the protruding nub 330 may extend beyond the generally vertical portions of the lateral walls 324).

Figure 4C:
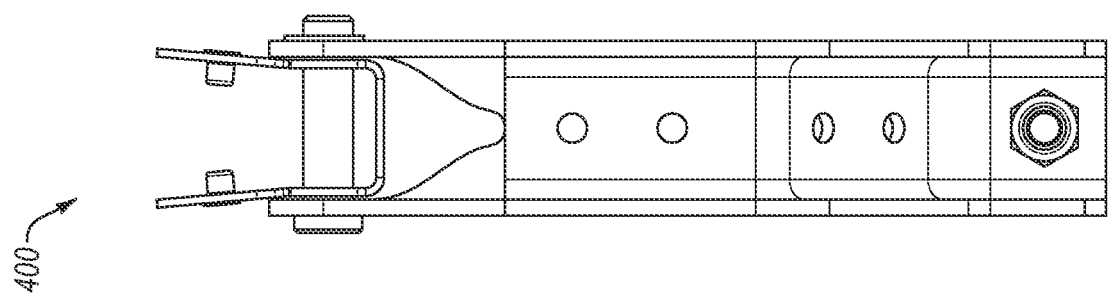
FIG. 4C is an end view of the second example embodiment of the module clamp.
Figure 4B:
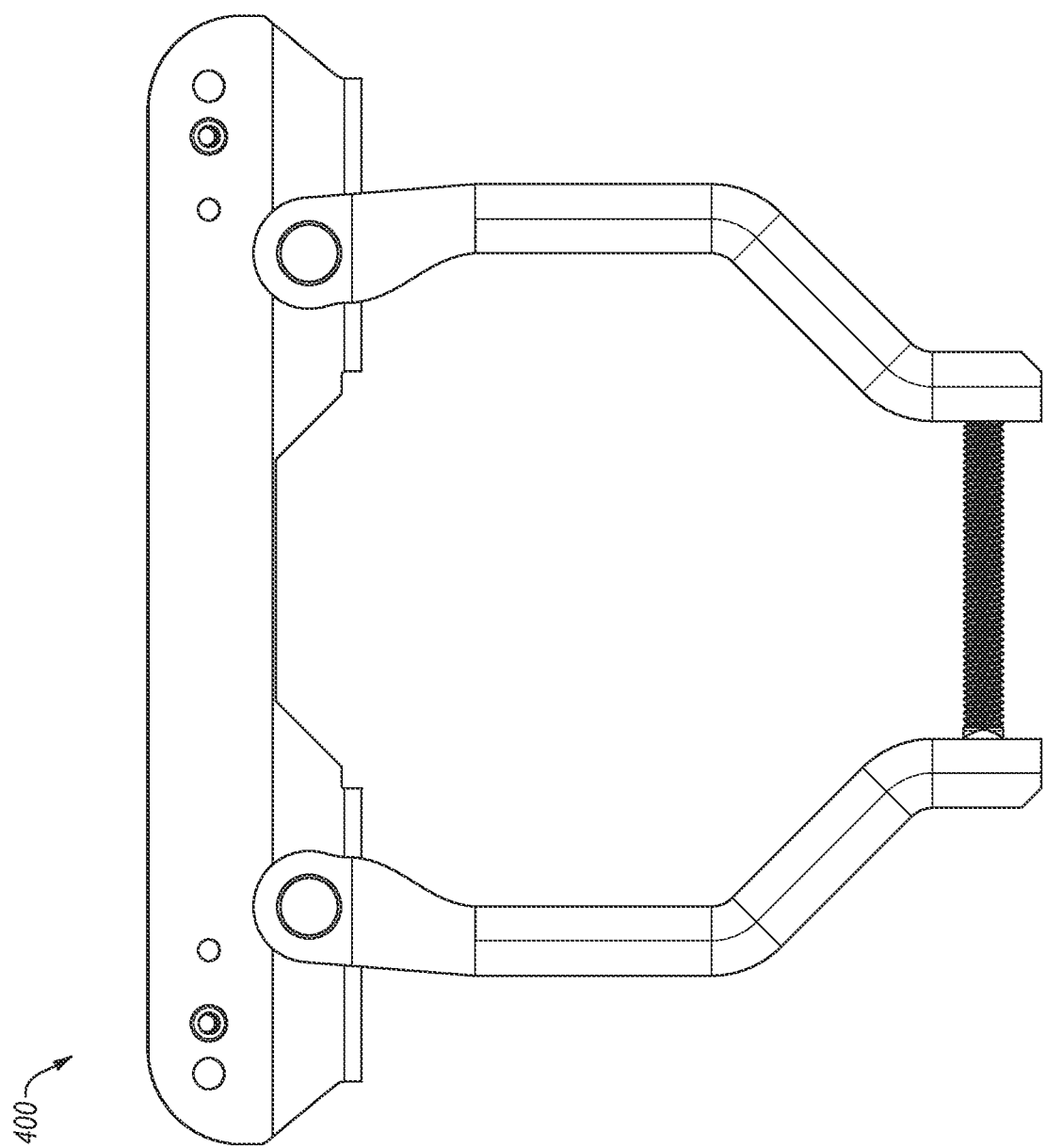
FIG. 4B is a side view of the second example embodiment of the module clamp.

FIG. 4A is an isometric view of a second example embodiment of a module clamp 400 with insertion pegs 430 according to at least one embodiment of the present disclosure. FIG. 4B is a side view of the third example embodiment of the module clamp 400, and FIG. 4C is an end view of the third example embodiment of the module clamp 400. The embodiments illustrated in FIGS. 4A-4C may operate in a similar manner to those described in reference to FIGS. 1A-1C, with a module rail being pressed into the module clamp to seat the module rail in the seating portion to lock the module rail (and the PV modules attached thereto) in place relative to the module clamp.

In some embodiments, the insertion pegs 430 may be fastening features that are punched, bored, drilled, or otherwise inserted through one or more lateral walls of the seating portion. Additionally or alternatively, one or more openings may be punched, bored, drilled, cast, or otherwise formed in or through the lateral walls of the seating portion, and the insertion pegs 430 may be inserted through the openings. For example, openings may be drilled through the lateral walls of the seating portion, and the insertion pegs 430 may include pop rivets or other rivets that are inserted and locked into the openings. As another example, the insertion pegs 430 may include threaded or partially threaded pegs that are drilled into the lateral walls of the seating portion via a flow drill fastening process. As an additional example, the insertion pegs 430 may include a bolt and/or nut that is sized and positioned to correspond to openings in the PV module frame/rail.

Figure 5A:
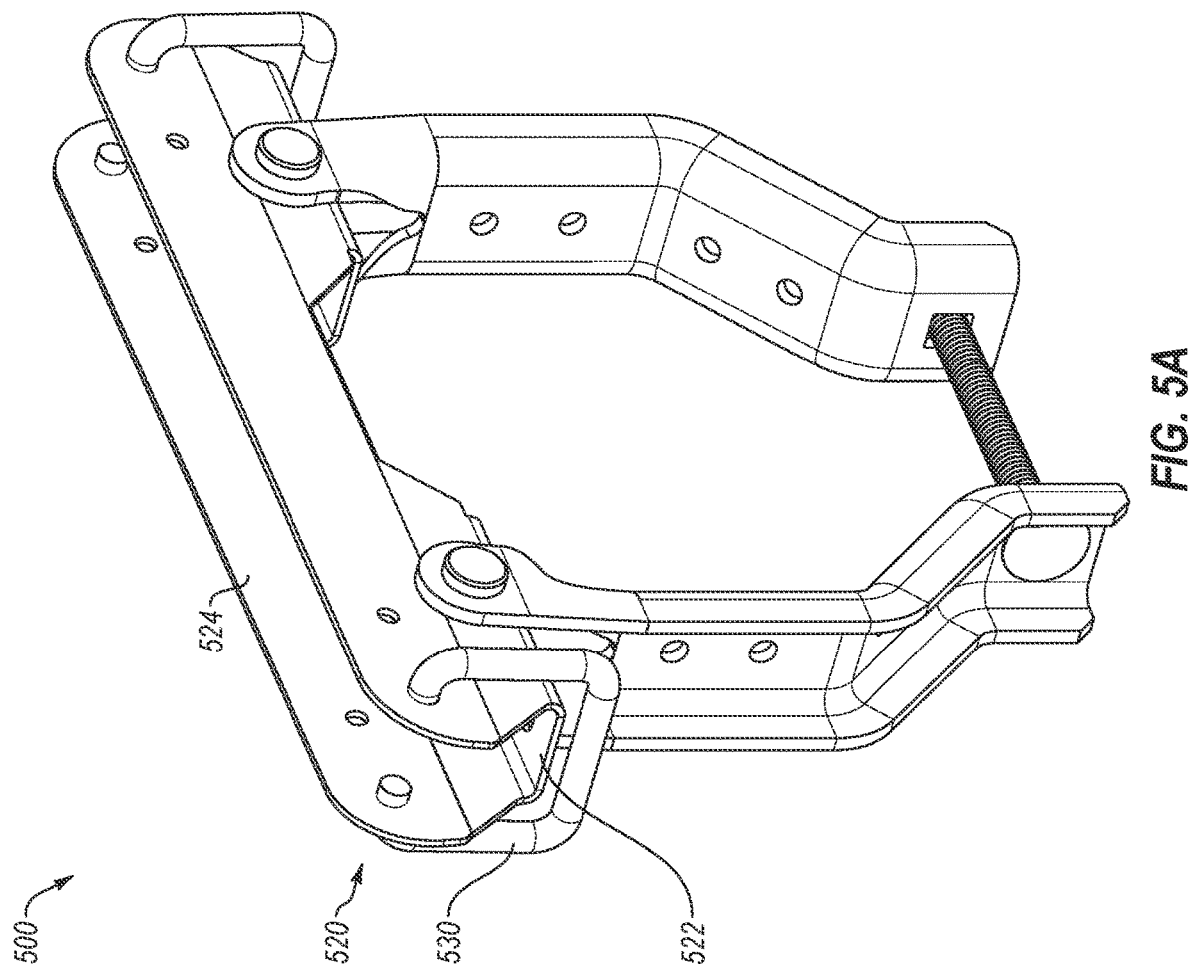
FIG. 5A is an isometric view of a third example embodiment of a module clamp with external wire forms according to at least one embodiment of the present disclosure.
Figure 5C:
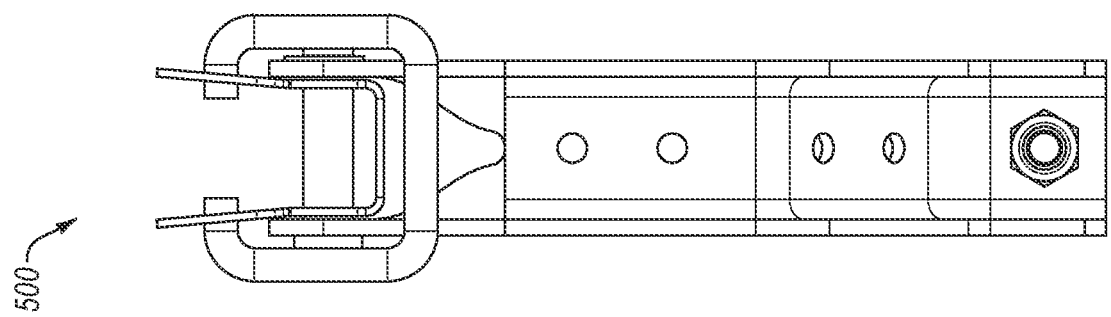
FIG. 5C is an end view of the third example embodiment of the module clamp.
Figure 5B:
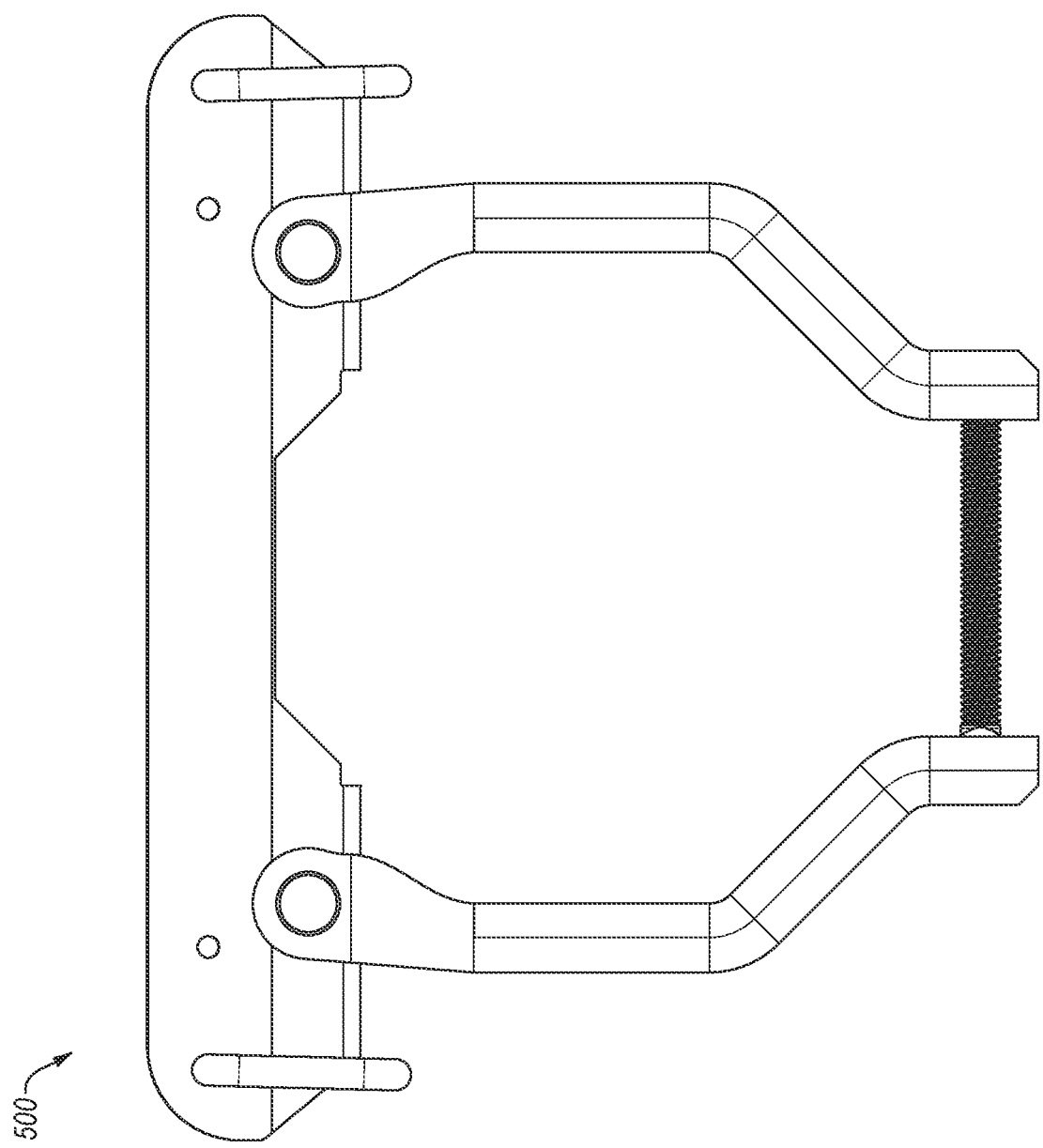
FIG. 5B is a side view of the third example embodiment of the module clamp.

FIG. 5A is an isometric view of a third example embodiment of a module clamp 500 with external wire forms 530 according to at least one embodiment of the present disclosure. FIG. 5B is a side view of the fourth example embodiment of the module clamp 500, and FIG. 5C is an end view of the fourth example embodiment of the module clamp 500. The embodiments illustrated in FIGS. 5A-5C may operate in a similar manner to those described in reference to FIGS. 1A-1C, with a module rail being pressed into the module clamp to seat the module rail in the seating portion to lock the module rail (and the PV modules attached thereto) in place relative to the module clamp.

In some embodiments, the external wire forms 530 may be fastening features that include a wire that is bent, cast, or otherwise formed to interface with one or more openings in the lateral walls 524 of the seating portion. For example, the external wire forms 530 may include a wire bent into a rounded rectangular shape with an open edge (as illustrated in FIGS. 5A-5C), a triangular shape, a curved or hemispherical shape, or any other suitable shape. A first end and a second end of the external wire form 530 may each interface with an opening in the lateral walls 524 of the seating portion 520 such that the external wire form 530 is coupled to the module clamp. In these and other embodiments, the ends of the external wire form 530 may extend through the openings in the lateral walls 524 and into the interior region of the seating portion and function in the same or a similar manner as the protruding nubs 330 and/or the insertion pegs 430 as described above in relation to FIGS. 3A-3C and/or 4A-4C, respectively. For example, as a module rail is pressed into the seating portion 520, the module rail may interfere with the ends of the external wire form 530 and force the external wire form 530 to deform in such a way that the ends are pushed back out of their holes far enough for the module rail to pass the ends of the external wire form 530 towards the base surface 522 and be seated in the seating portion 520. An opening of the module rail may align with the ends of the external wire form 530 when fully seated such that when aligned, the external wire form 530 springs back to its original position when the ends of the external wire form 530 are able to pop into the openings in the module rail.

Figure 5D:
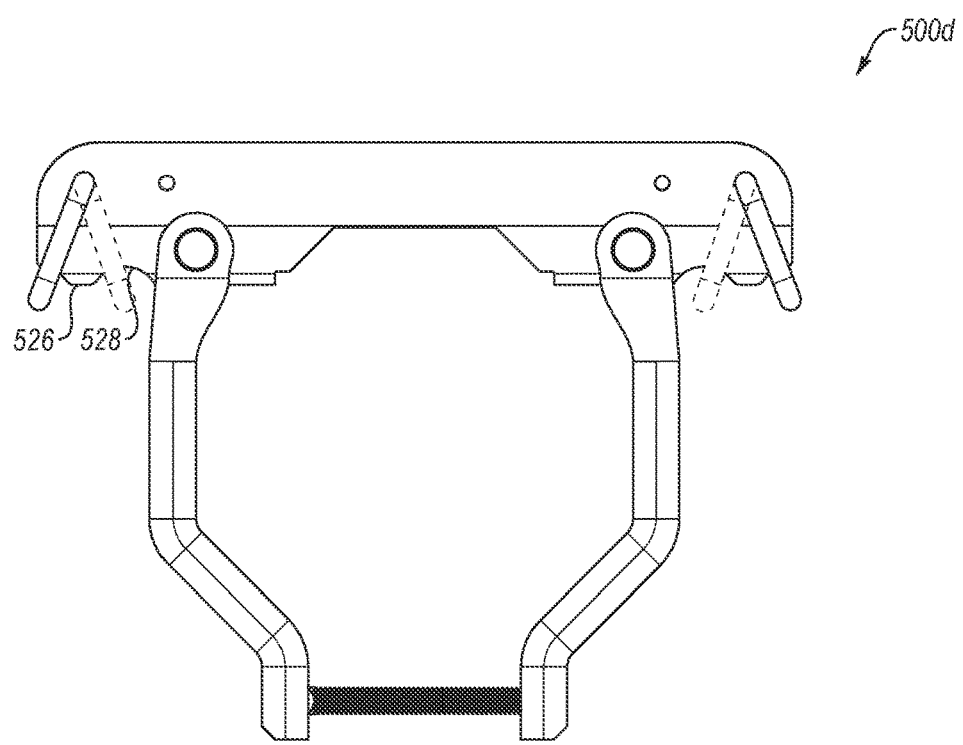
FIG. 5D is a side view of the third example embodiment of the module clamp including a second configuration of an external wire form positioned to secure a module rail.
Figure 5E:
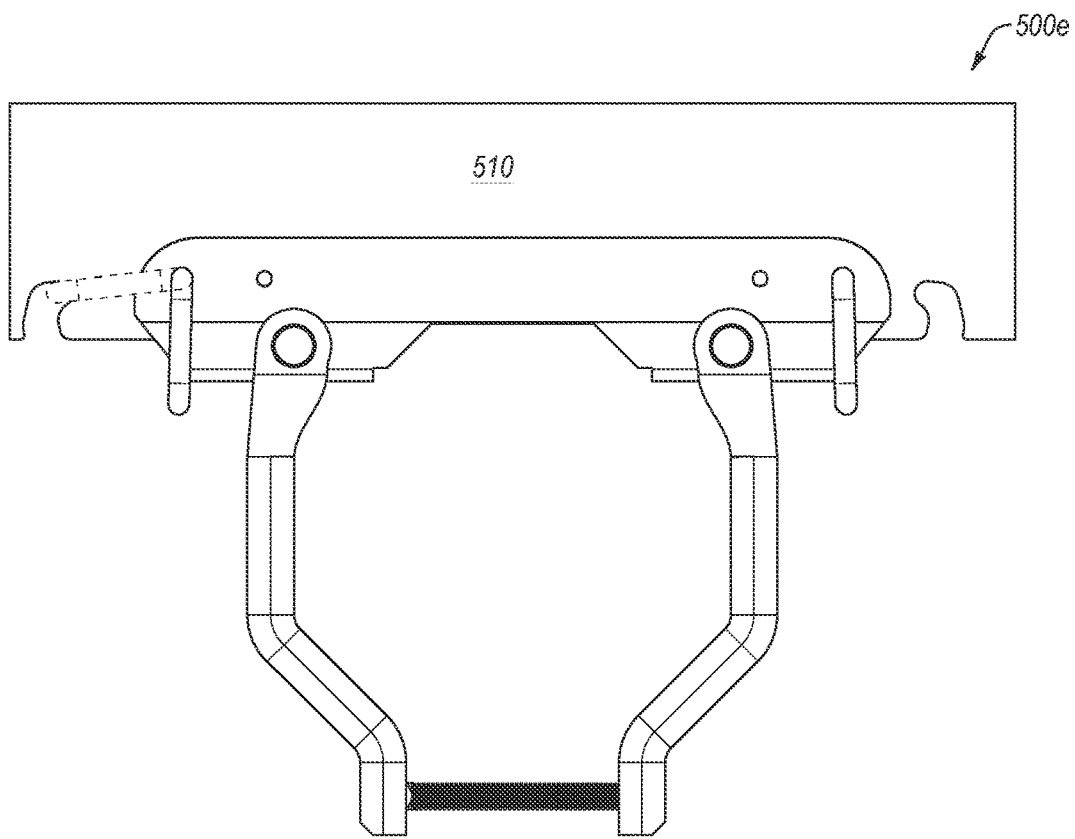
FIG. 5E is a side view of the third example embodiment of the module clamp including a third configuration of the external wire form positioned to secure the module rail.

In addition to the locking in place obtained by the ends of the external wire form 530 popping into the opening in the module rail, the external wire form 530 may be used to provide an additional locking feature. For example, the external wire forms 530 may include an elongated length such that the external wire forms 530 may rotate underneath the seating portions of the module clamps and further secure module rails and/or PV modules coupled to the module clamps (for example, as illustrated in a snap-lock PV module mounting system 500d shown in FIG. 5D). For example, the external wire form 530 may be rotated past a ridge 526 over which the external wire form 530 is to deform to get past. On the other side of the ridge 526, the external wire form 530 may reside in a valley 528 that may keep the external wire form 530 in some tension so that the ends of the external wire form 530 are less likely to pop out and/or otherwise may more securely retain the external wire form 530 in place. Additionally or alternatively, the external wire forms 530 may be shaped or formed such that the external wire form 530 is configured to rotate up and around a portion of a module rail 510 (for example, as illustrated in a snap-lock PV module mounting system 500e shown in FIG. 5E). For example, the external wire form 530 may extend over a ridge 526 in the module rail and into a valley 528 on the other side of the ridge 526 such that without significant external force, the external wire form 530 may remain in the valley 528 and will not traverse up over the ridge 526. By doing so, the module rail 510 may be more securely affixed to the module clamp of the snap-lock PV module mounting system 500e.

Figure 6:
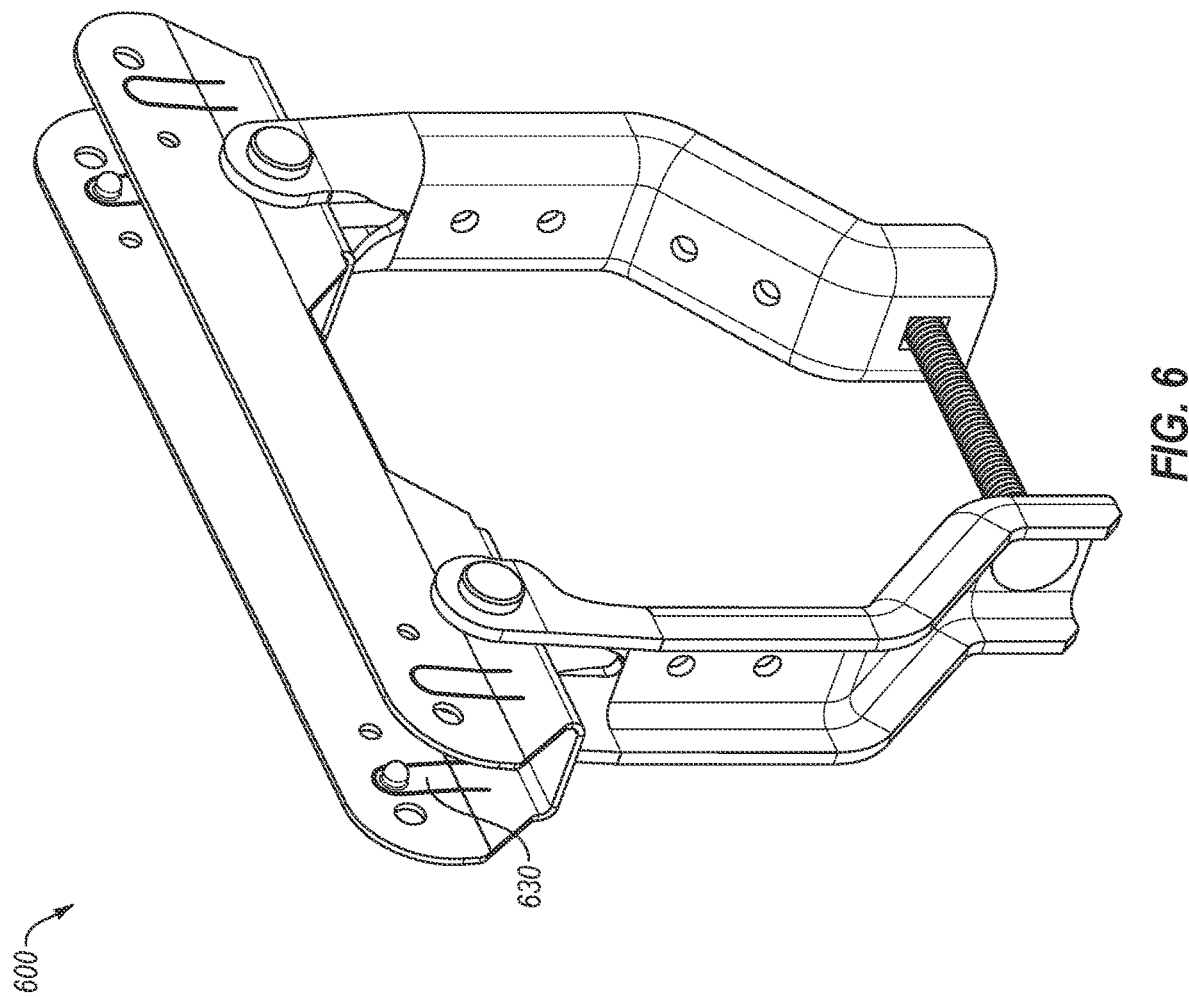
FIG. 6 is an isometric view of a fourth example embodiment of the module clamp with spring tabs according to at least one embodiment of the present disclosure.

FIG. 6 is an isometric view of a fourth example embodiment of a module clamp 600 with spring tabs 630 according to at least one embodiment of the present disclosure. The embodiments illustrated in FIGS. 6A-6C may operate in a similar manner to those described in reference to FIGS. 1A-1C, with a module rail being pressed into the module clamp to seat the module rail in the seating portion to lock the module rail (and the PV modules attached thereto) in place relative to the module clamp.

The spring tabs 630 may be fastening features that include one or more sections cut out from the lateral walls of the seating portion such that the cut-out sections are capable of some degree of movement via flexion at the interface points of the spring tabs 630 and are attached to the lateral walls of the seating portion on at least one edge. In some embodiments, the spring tabs 630 may be oriented such that the cut-out sections face the open end of the seating portion (as illustrated in FIG. 6). Additionally or alternatively, the spring tabs 630 may be oriented such that the cut-out sections face a base surface of the seating portion. In these and other embodiments, placing the module rail in the seating portion may push the lateral walls of the module clamp outward and facilitate the spring tabs 630 interfacing with one or more corresponding openings, hooks, and/or any other structures of the module rail. Additionally or alternatively, the module rail and/or the seating portion may be sized to be comparable in size such that the lateral walls of the seating portion may not be displaced by the module rail being pressed into the seating portion but may push the spring tabs 630 outward until openings in the module rail are aligned with the protrusions on the spring tabs 630. When aligned, the spring force caused by the outwards flexion of the spring tabs 630 may cause the protrusions of the spring tabs 630 to spring into the holes of the module rail.

Figure 7C:
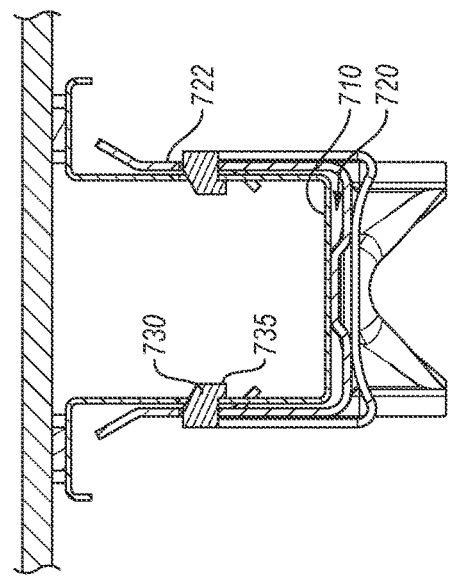
FIG. 7C is a cross-sectional view of the fifth example embodiment of the module clamp.
Figure 7B:
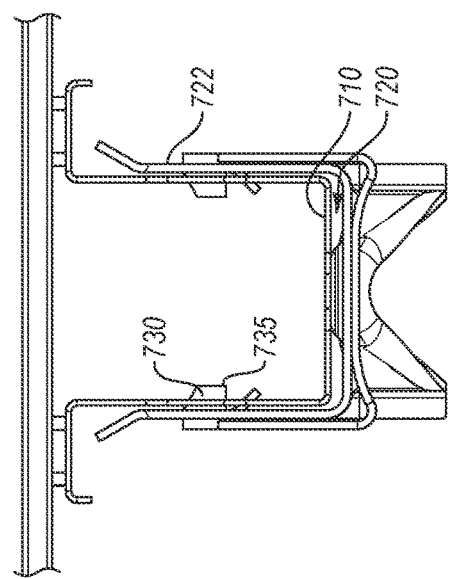
FIG. 7B is a side view of the fifth example embodiment of the module clamp.
Figure 7A:
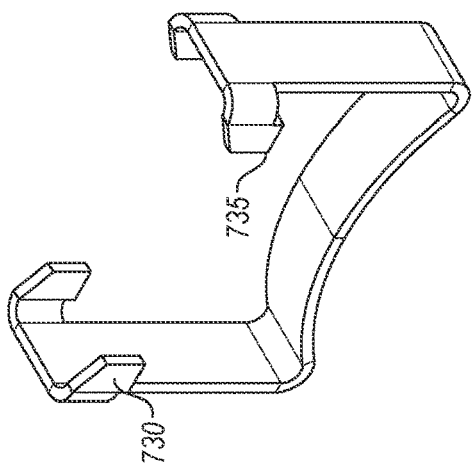
FIG. 7A is an isometric view of a fifth example embodiment of the module clamp with hook tabs according to at least one embodiment of the present disclosure.

FIG. 7A is an isometric view of an example embodiment of a module clip 750 with hook tabs 730 according to at least one embodiment of the present disclosure. FIG. 7B is a side view of the fifth example embodiment of the module clip 750, and FIG. 7C is a cross-sectional view of a fifth example embodiment of a module clamp 700. In some embodiments, the hook tabs 730 may be fastening features that interface with one or more openings of a module rail 710 as the module rail 710 is seated in a seating portion 720. A flange 735 at the end of each of the hook tabs 730 may prevent the module rail 710 and module clamp 700 from disengaging from one another.

In these and other embodiments, the module rail 710 may be seated into the seating portion 720 of a module clamp 700 (such as shown in FIG. 7B by the module rail being flush against the flared portions of the seating portion 720), followed by the module clip 750 being forced from below up and over the module clamp 700 until the hook tabs 730 are forced outwards by the flaring of the seating portion 720.

When the flange 735 of the module clip 750 align with holes in the seating portion 720 and/or the module rail 710, the spring force from deforming the module clip 750 may cause the flanges 735 to extend into the holes.

In the embodiment illustrated in FIG. 7C, a similar hook tab 730 with flanges 735 as that illustrated in FIGS. 7A and 7B may be used in a similar or comparable manner as the protruding feature of FIGS. 1A-1C. For example, lateral walls 722 may flare or flex outwards as the module rail 710 is pressed into the seating portion 720 until holes in the module rail 710 align with the hook tabs 730 and the hook tabs 730 spring into the aligned holes to lock the module rail 710 in place relative to the seating portion 720.

FIG. 8 is an isometric view of a sixth example embodiment of a module clamp 800 with a spring-loaded protrusion 830 according to at least one embodiment of the present disclosure. The spring-loaded protrusion 830 may be a fastening feature that includes a peg 832 projecting into the interior region of a seating portion 810 (shown as the dashed box corresponding to the peg 832, indicating it is seen through the flaring portion of the seating portion 810).

In some embodiments, placing the module rail in the seating portion 810 of the module clamp 800 may apply an outward force to the peg 832 of the spring-loaded protrusion 830, causing the peg 832 to retract into a spring chamber 834 of the spring-loaded protrusion 830. When a hole in the module rail is aligned with the peg 832, the spring force of the spring chamber 834 may cause the peg 832 to spring back out of the spring chamber 834 and into the hole in the module rail. The peg 832 being disposed in the hole of the module rail and biased into the hole of the module rail by the spring force of the spring chamber 834, may lock the module rail in position relative to the module clamp 800.

In some embodiments, the module clamp 800 may include a fastener 840 extending through a base surface of the seating portion 810. In some embodiments, the fastener 840 may be configured to interface with a corresponding opening in the module rail (e.g., on a bottom surface of the module rail configured to sit flush against the base surface of the seating portion). Additionally or alternatively, the fastener 840 may be configured to interface with a surface of the mounting rail to reduce and/or prevent sliding, rattling, shifting, or any other movements of the mounting rail.

Additionally, FIG. 8 illustrates examples of a nut and bolt arrangement 850 of the protruding feature and a rivet example 860 of the protruding feature. As illustrated in FIG. 8, in some embodiments multiple types of protruding features may be disposed in a single implementation. For example, spring-loaded protrusions 830 may be used on one side of the seating portion 810 while rivets or bolted pegs may be disposed on the other side of the seating portion 810.

Figure 9:
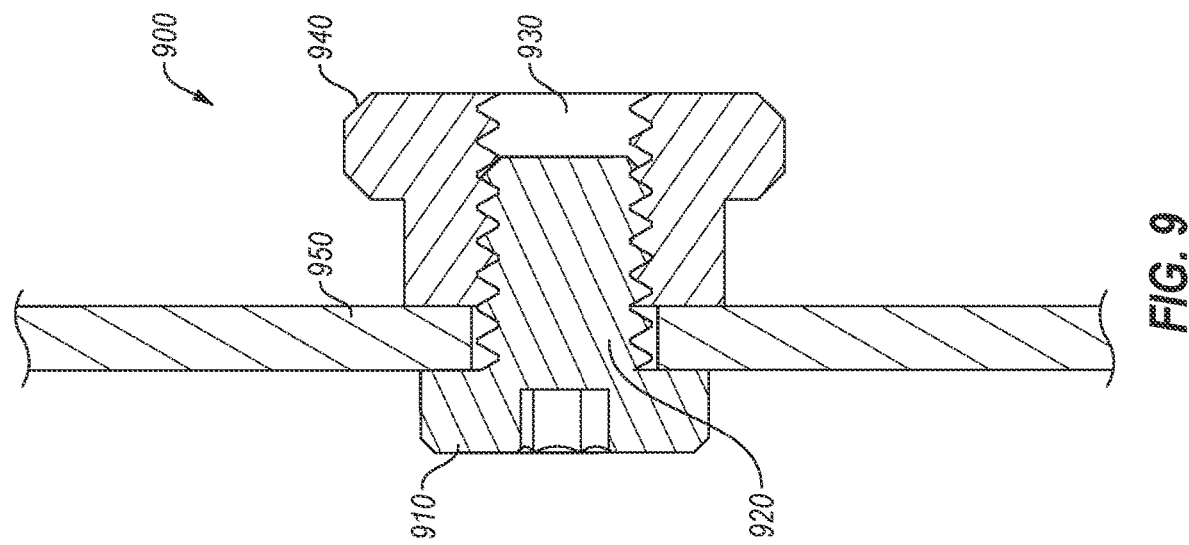
FIG. 9 illustrates a side view of a custom nut according to at least one embodiment of the present disclosure.

FIG. 9 illustrates a side view of a custom bolt 900 according to at least one embodiment of the present disclosure. In some embodiments, the custom bolt 900 may be used as the protruding feature (e.g., in place of the protruding nubs 330, the insertion pegs 430, the external wire forms 530, the spring tabs 630, the hook tabs 730, and/or the spring-loaded protrusion 830 as described above). The custom bolt 900 may include a head 910, a body 920, and a custom nut 930. The body 920 may be inserted through a surface 950, such as the flared portion of the lateral walls of the seating portion, causing the head 910 to be positioned flush against a first side of the surface 950. The custom nut 930 may be coupled to the body 920 such that the custom nut 930 is positioned flush against a second side of the surface 950. In some embodiments, the custom nut 930 may include one or more sloped edges 940 (e.g., chamfer edges) and/or protrusions with sloped edges, which may facilitate spreading out the lateral walls of the module clamp during installation of the module rail with the module clamp. Additionally or alternatively, the custom nut 930 may facilitate preventing the module rail from dislodging from the custom nut 930 acting as the protruding feature. For example, the protrusions at the distal end of the custom nut 930 may catch or otherwise prevent the module rail from moving past the protrusions.

Figure 10B:
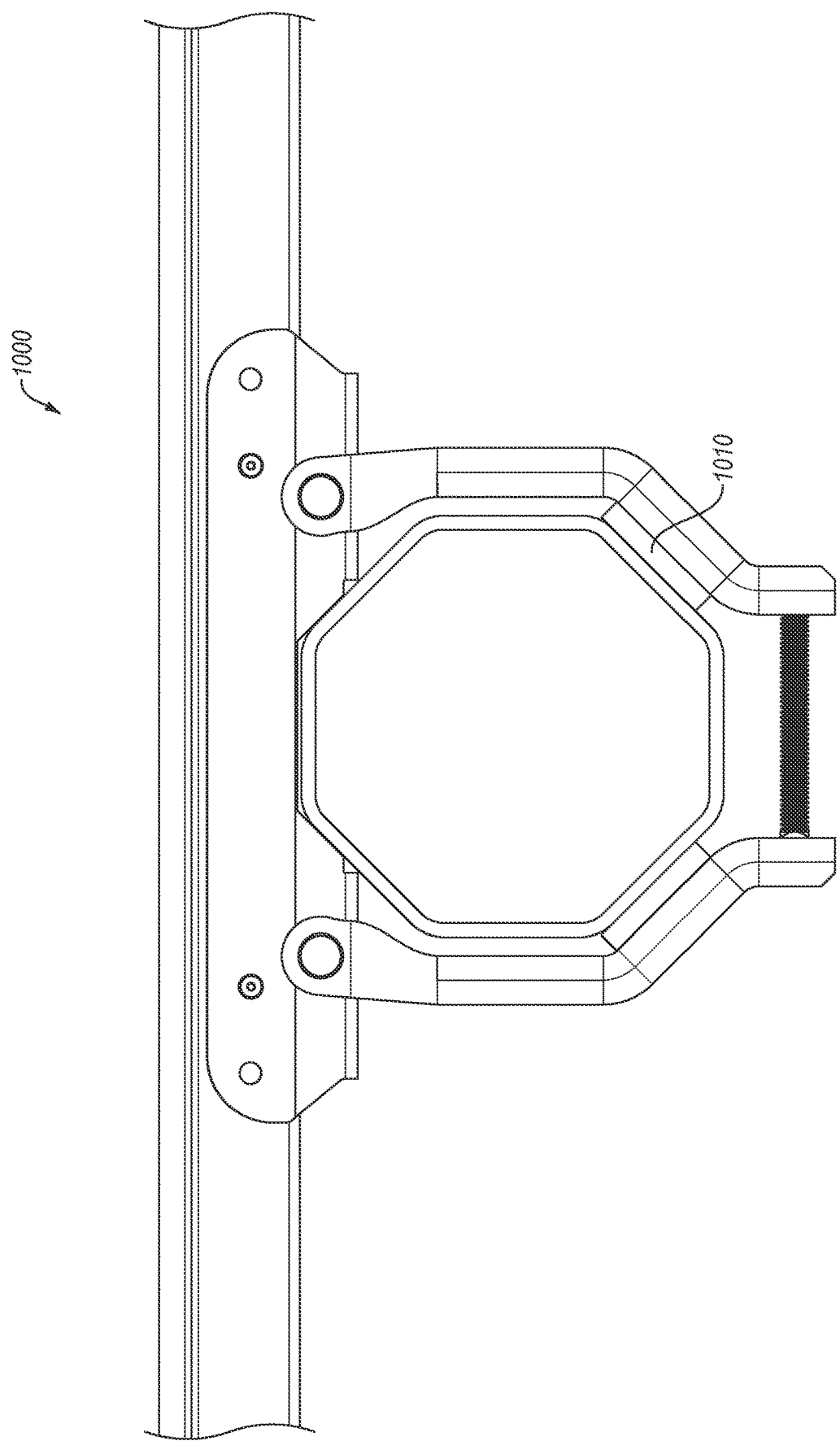
FIG. 10B is a side view of the seventh example embodiment of the module clamp.

FIG. 10A is an isometric view of a module clamp 1000 according to at least one embodiment of the present disclosure, and FIG. 10B is a side view of the module clamp 1000. The module clamp 1000 may include one or more spacers 1010 positioned against a clamp body 1005. For example, the spacers 1010 may be positioned flush against a bottom-left surface and/or a bottom-right surface of the clamp body 1005 as illustrated in FIGS. 10A and 10B. Additionally or alternatively, the spacers 1010 may be positioned flush against a left surface, a right surface, a bottom surface, a top surface, a top left surface, a top-right surface, or any other surface of the clamp body 1005. Additionally or alternatively, the spacers 1010 may include a shape and/or size corresponding to the geometry of the clamp body 1005 and/or the module support structure (e.g., torque tube). For example, the spacers 1010 may include a curved shape to correspond to a curved surface of the clamp body 1005 and/or the module support structure (e.g., torque tube). As illustrated in FIG. 10B, the spacers 1010 coupled to the clamp body 1005 may be positioned flush against one or more surfaces of a module support structure. In some embodiments, the spacers 1010 may reduce and/or prevent movement of the module support structure and/or a corresponding PV module coupled to the module clamp 1000. Additionally or alternatively, the spacers 1010 may facilitate coupling the module clamp 1000 to which the spacers 1010 are attached to a wider variety of module support structures including different sizes and/or geometries. In these and other embodiments, the spacers 1010 may include a textured or roughed surface to increase friction between the surfaces of the spacers 1010 and the surfaces of the module support structure. Additionally or alternatively, the spacers 1010 may facilitate ensuring surface-to-surface contact between the module support structure (e.g., torque tube) and the PV module rail.

Figure 11:
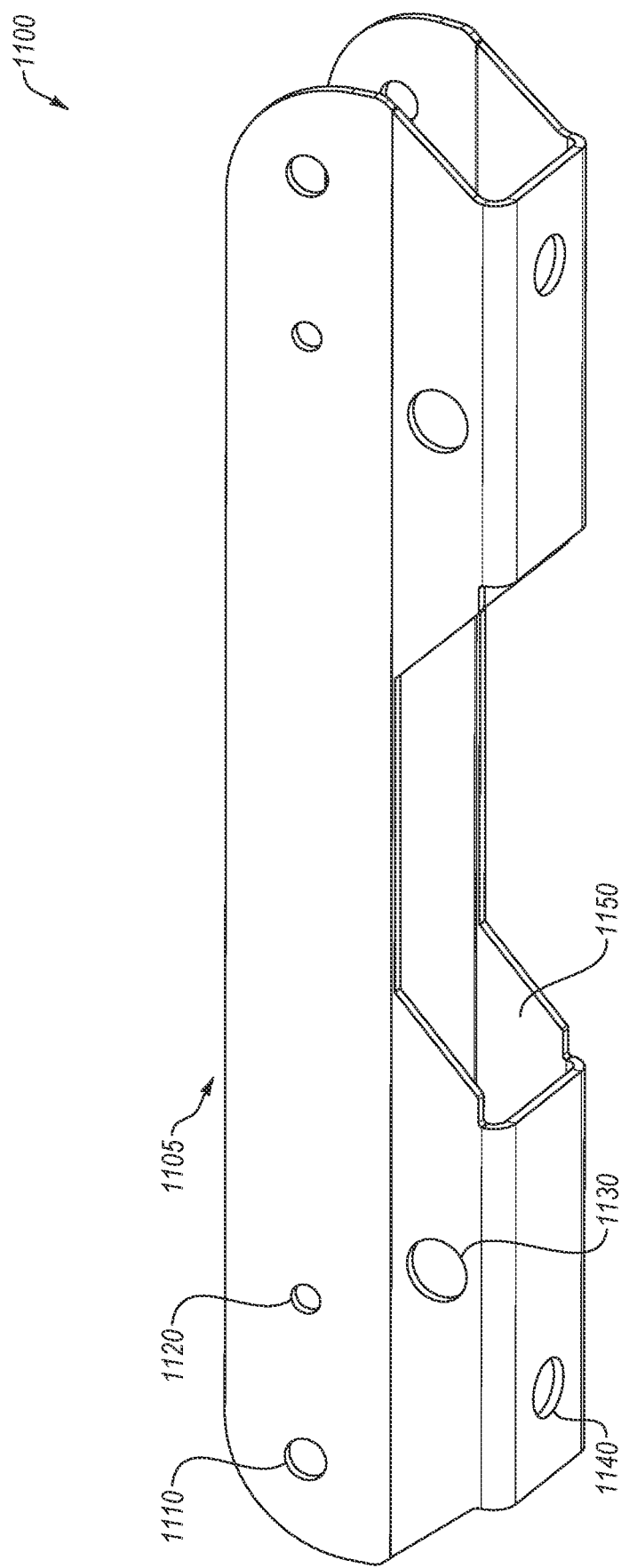
FIG. 11 illustrates a seating portion of the module clamp according to at least one embodiment of the present disclosure.

FIG. 11 illustrates a seating portion 1105 of a module clamp 1100 according to at least one embodiment of the present disclosure. The seating portion 1105 may include various opening patterns, such as patterns 1110-1140, to facilitate fitting various shapes, sizes, and/or configurations of module rails. In some embodiments, one or more lateral walls 1150 of the seating portion 1105 may include a sloped profile (not shown) such that placing the mounting rail in the seating portion 1105 causes one or more surfaces of the mounting rail to follow the sloped profile. Additionally or alternatively, the lateral walls 1150 having the sloped profiles may include one or more increases in height (e.g., curved hills, straight-edged plateaus, or any other sloped profiles) towards the interior region of the seating portion 1105 followed by a subsequent decrease in height away from the interior region of the seating portion 1105, which may increase the force used to insert the mounting rail in the seating portion 1105 and further increase the force used to remove the mounting rail from the seating portion 1105 in the same direction.

Figure 12A:
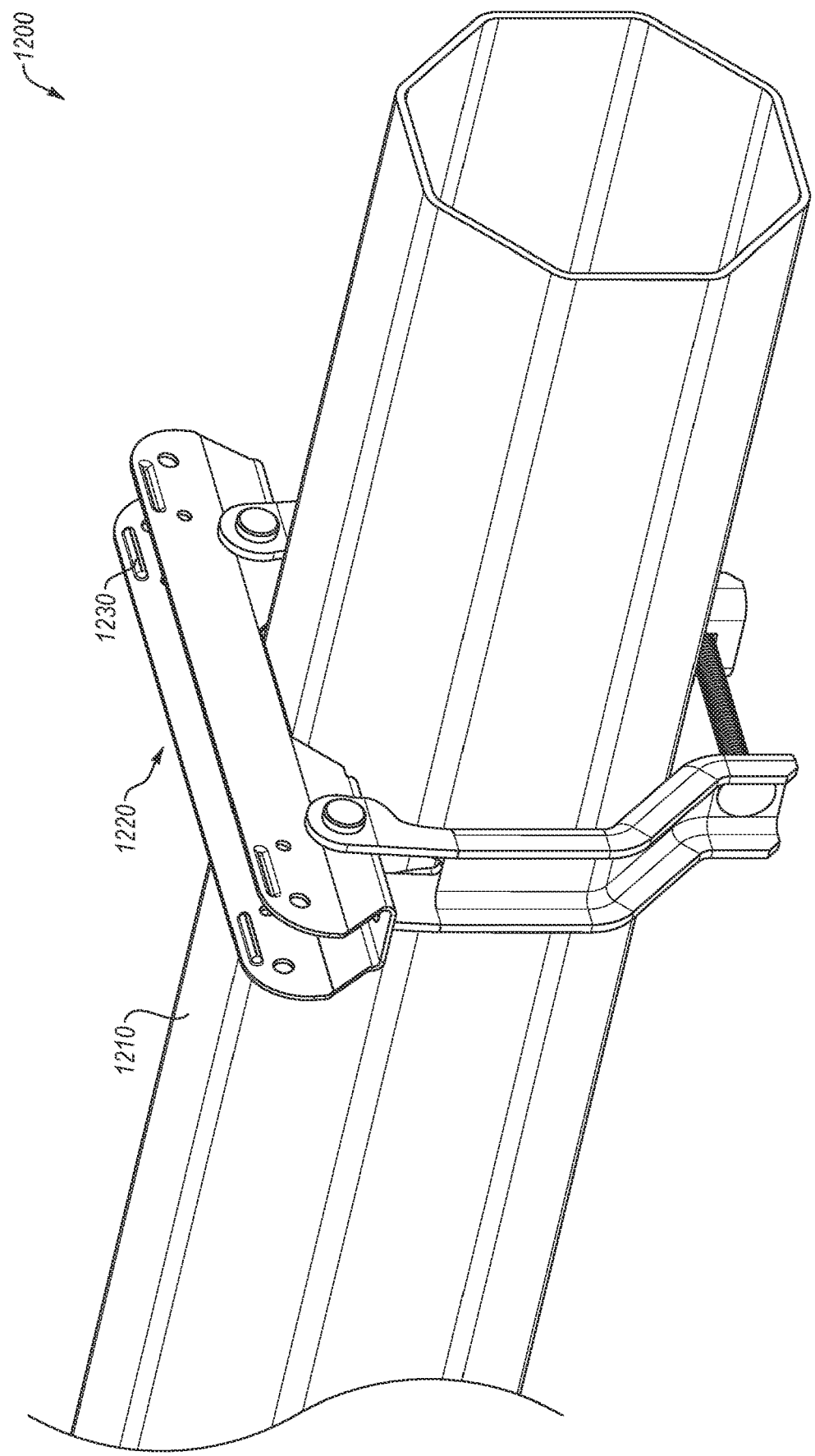
FIG. 12A is an isometric view of an eighth example embodiment of the module clamp coupled to a torque tube according to at least one embodiment of the present disclosure.

FIGS. 12A and 12B are isometric views of an eighth example embodiment of a module clamp 1200 that may be coupled to a torque tube 1210 according to at least one embodiment of the present disclosure. The module clamp 1200 may include a seating portion 1220 that has one or more pop-out tabs 1230 that may be cut out, punched out, or otherwise formed from the lateral walls of the seating portion of the snap-lock PV module mounting system. In some embodiments, the pop-out tabs 1230 may be fastening features oriented such that the cut-out sections face the open end of the seating portion (as illustrated in FIGS. 12A and 12B), projecting into the interior region of the seating portion 1220. In these and other embodiments, placing the module rail in the seating portion 1220 may push the lateral walls of the module clamp outward and facilitate the pop-out tabs 1230 interfacing with one or more corresponding openings, hooks, and/or any other structures of the module rail. Additionally or alternatively, the module rail and/or the seating portion 1220 may be sized to be comparable in size such that the lateral walls of the seating portion 1220 may not be displaced by the module rail being pressed into the seating portion 1220 but may push against the pop-out tabs 1230 until one or more mounting structures along the module rail are aligned with openings 1232 on the pop-out tabs 1230 and/or the pop-out tabs 1230. When aligned, the mounting structures of the module rail may extend through the openings 1232 and cause the pop-out tabs 1230 to fasten module rail to the module clamp 1200. Additionally or alternatively, the pop-out tabs 1230 may be the portion of the seating portion 1220 that is forced to flex out of the way when the module rail is pressed into the seating portion, and the flexion of the pop-out tabs 1230 may cause the pop-out tabs 1230 to pop back into an opening in the module rail when aligned with the pop-out tabs.

Figure 13:
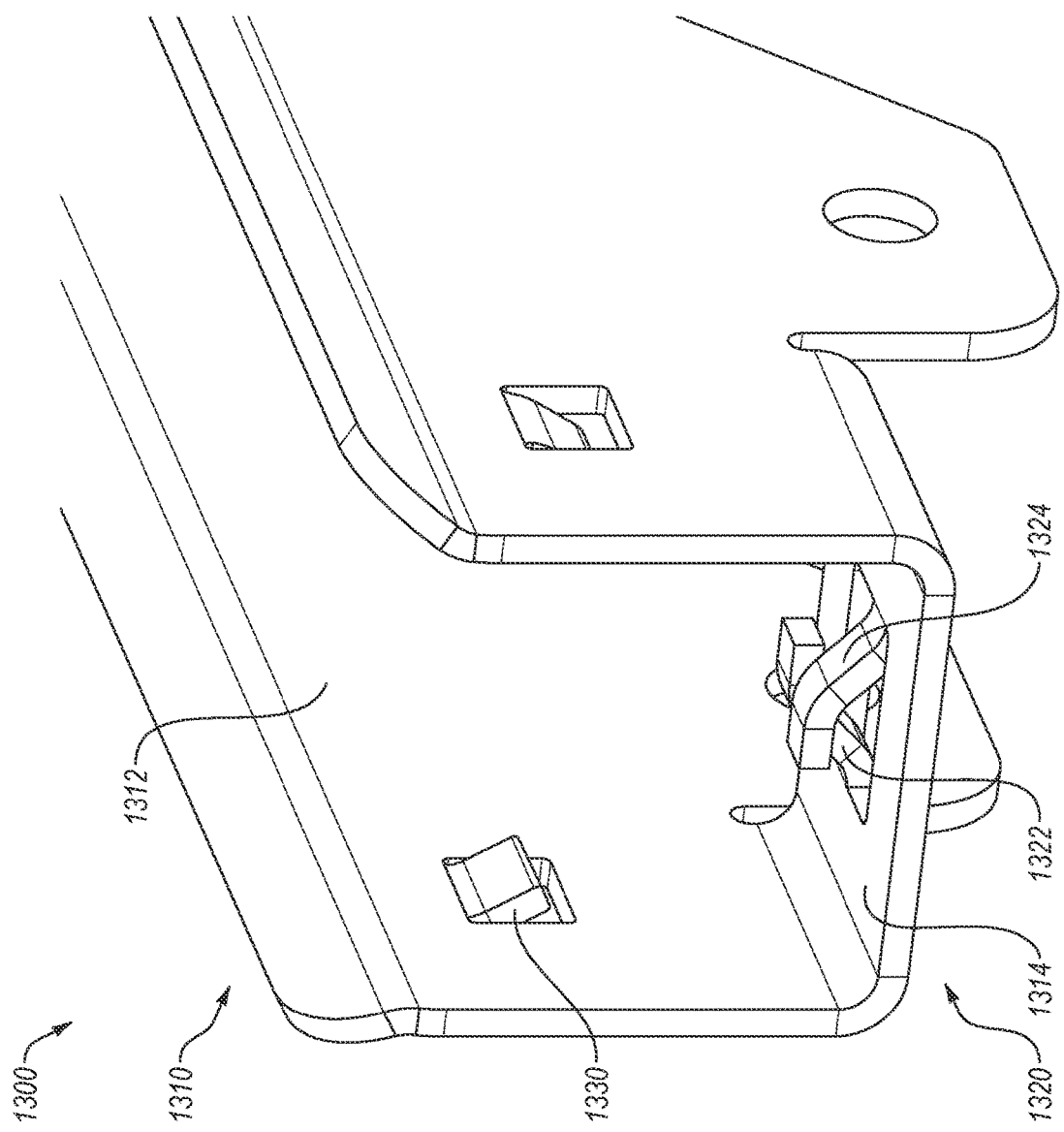
FIG. 13 is a close-up view of a ninth example embodiment of the module clamp according to at least one embodiment of the present disclosure.

FIG. 13 is a close-up view of a module clamp 1300 of the snap-lock PV module mounting system according to at least one embodiment of the present disclosure. The module clamp 1300 may include a seating portion 1310 that is shaped such that a module rail of a PV module may be aligned to sit within the seating portion 1310. The seating portion 1310 may be made of one or more lateral walls 1312 that are connected by a base surface 1314. In some embodiments, the lateral walls 1312 and the base surface 1314 may form a U-shaped channel into which the module rail of the PV module may be positioned. In these and other embodiments, the seating portion 1310 of the module clamp 1300 may be the same as or similar to the seating portion 144 described in relation to FIG. 1B.

In some embodiments, one or more tabs 1330 may be fastening features included on the lateral walls 1312 of the seating portion 1310. The tabs 1330 may be positioned along a length of the lateral walls 1312 and protrude into an interior of the seating portion 1310 such that the tabs 1330 align with holes, hooks, protrusions, or any other mounting features of a module rail that is placed in the seating portion 1310. As the module rail is placed in the seating portion 1310, the lateral walls 1312 may flare out and expand the space of the seating portion 1310 to accommodate the module rail, and after being placed a sufficient distance within the seating portion 1310, the tabs 1330 may interface with the mounting features (e.g., the openings) of the module rail to secure the module rail relative to the module clamp 1300.

In some embodiments, the module clamp 1300 may include a pressure pad 1320 that is made of one or more bridge lances 1322, 1324, which may protrude from the base surface 1314 of the seating portion 1310. In some embodiments, an example module rail, when fully seated within the seating portion 1310, may not completely reach the base surface such that a bottom surface of the example module rail interfaces with the base surface 1314. The pressure pad 1320 may provide a deformable surface against which the module rail may be pressed when seating into the seating portion 1310 that provides a spring force on the module rail positioned on the base surface 1314. In these and other embodiments, the pressure pad 1320 may be positioned underneath the tabs 1330 such that pressing the module rail into the seating portion 1310 deforms the bridge lances 1322, 1324 and after some deformation, the openings of the module rail interface with the tabs 1330 decreases deformation of the bridge lances 1322, 1324. Stated another way, after the openings of the module rail interface with the tabs 1330, the spring force of the bridge lances 1322, 1324 may force the module rail upwards against the tabs 1330. Such a feature may lock the module rail in position more securely and may prevent rattling or movement of the module rail within the seating portion 1310. Using such a feature may utilize an increased force when pressing the module rail into the seating portion 1310 when compared to a seating portion 1310 that may not include the pressure pad 1320.

FIG. 14A is a close-up view of a module clamp 1400 of a snap-lock PV module mounting system according to at least one embodiment of the present disclosure. In some embodiments, the module clamp 1400 may be the same as or similar to the module clamp 1300 as described in relation to FIG. 13 in that the module clamp 1400 includes lateral walls 1412 and a base surface 1414 that form a seating portion 1410a in which a mounting rail may be placed. To secure the mounting rail relative to the seating portion 1410a, the module clamp 1400 may include one or more openings through which a fastener 1430 may be slotted. In some embodiments, the fastener 1430 may be slotted through the openings of the module clamp 1400 to lock the module rail relative to the module clamp 1400.

Additionally or alternatively, the module clamp 1400 may include an extended tab 1420 that protrudes from the base surface 1414, and the module rail placed in the seating portion 1410a may rest on the extended tab 1420. In some embodiments, the extended tab 1420 may include a trapezoidal shape or any other hill shape so that a top surface 1422 of the extended tab 1420 is higher than the base surface 1414 of the seating portion 1410a. The extended tab 1420 may be depressed by the module rail, and the shape of the extended tab 1420 may provide a spring force that opposes the downward force of the module rail being placed in the seating portion 1410a.

In some embodiments, when the module rail is resting on the top surface 1422, the openings in the module rail may not align with the holes through which the fastener 1430 is configured to extend. When the module rail is pressed against the top surface 1422, causing the extended tab 1420 to deform, the openings in the module rail and the lateral walls 1412 may align such that the fastener 1430 may then be fit into the openings. This may cause the extended tab 1420 to be in a deformed position when the fastener is in place, which may provide a spring force to keep the module rail and the seating portion 1410a locked into position such that the two move as a single component.

Figure 14B:
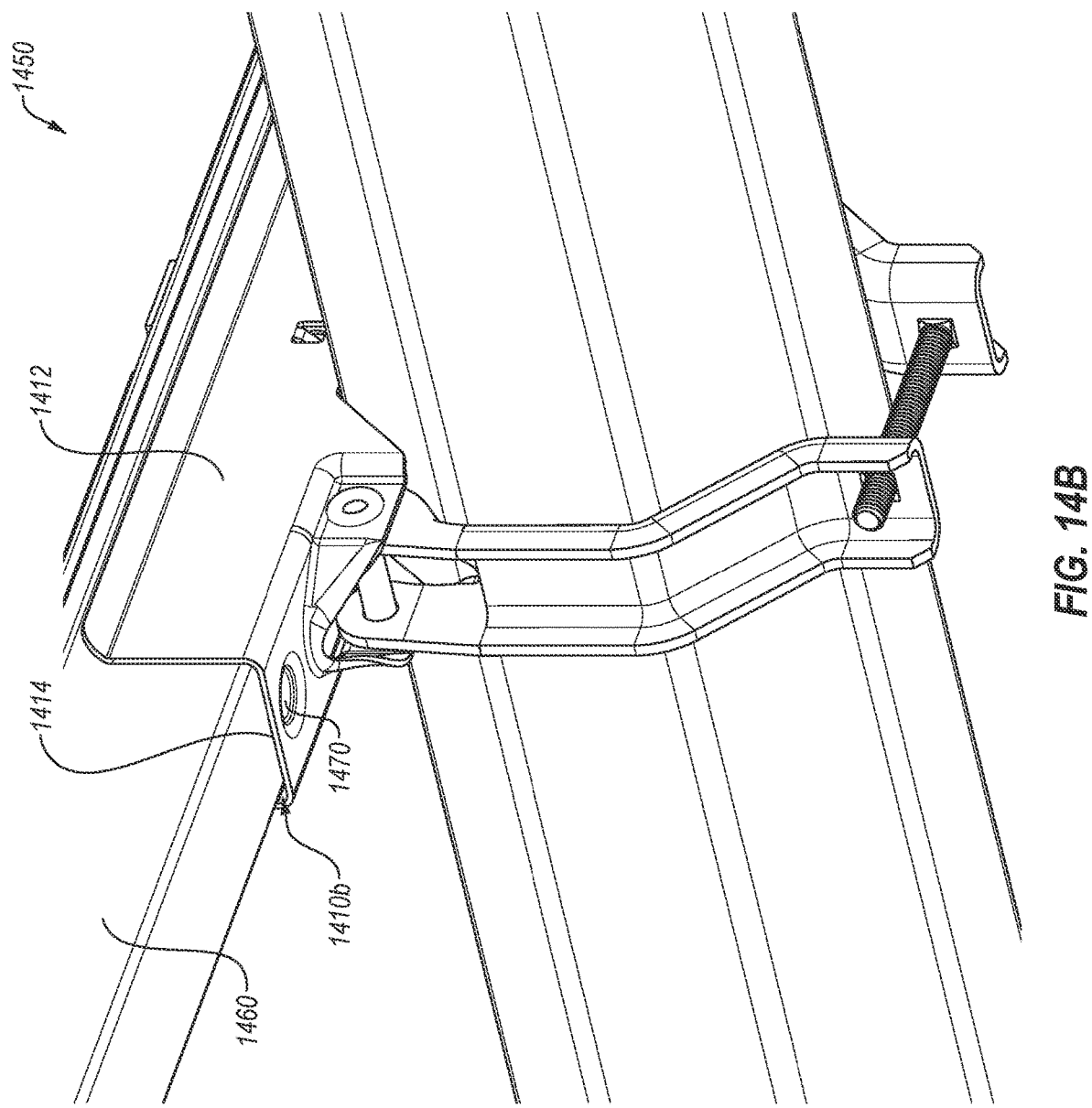

FIG. 14B is a close-up view of a module clamp 1450 of a snap-lock PV module mounting system according to at least one embodiment of the present disclosure. In some embodiments, the module clamp 1450 may be similar to the module clamp 1400 in that the module clamp 1450 includes the lateral walls 1412 and the base surface 1414 that form a seating portion 1410b in which a PV module rail 1460 may be placed. The module clamp 1450 may include a sump protrusion 1470 along the base surface 1414 of the seating portion 1410b. In some embodiments, the sump protrusion 1470 may be configured such that the PV module rail 1460 rests flush against the sump protrusion 1470 when the PV module rail 1460 is positioned in the seating portion 1410b. Consequently, the PV module rail 1460 may be offset from the base surface 1414 by a height of the sump protrusion 1470 when resting in the seating portion 1410b of the module clamp 1450. In these and other embodiments, the sump protrusion 1470 may provide an opposing force against the PV module rail 1460 that is not a spring force as provided by the bridge lances 1322, 1324 of the module clamp 1300 illustrated in FIG. 13 and/or the extended tab 1420 of the module clamp 1400 illustrated in FIG. 14A. In these and other embodiments, the sump protrusion 1470 may be sized to provide spacing such that openings in the PV module rail 1460 may align with openings in the lateral walls 1412 of the seating portion 1410b.

Figure 15:
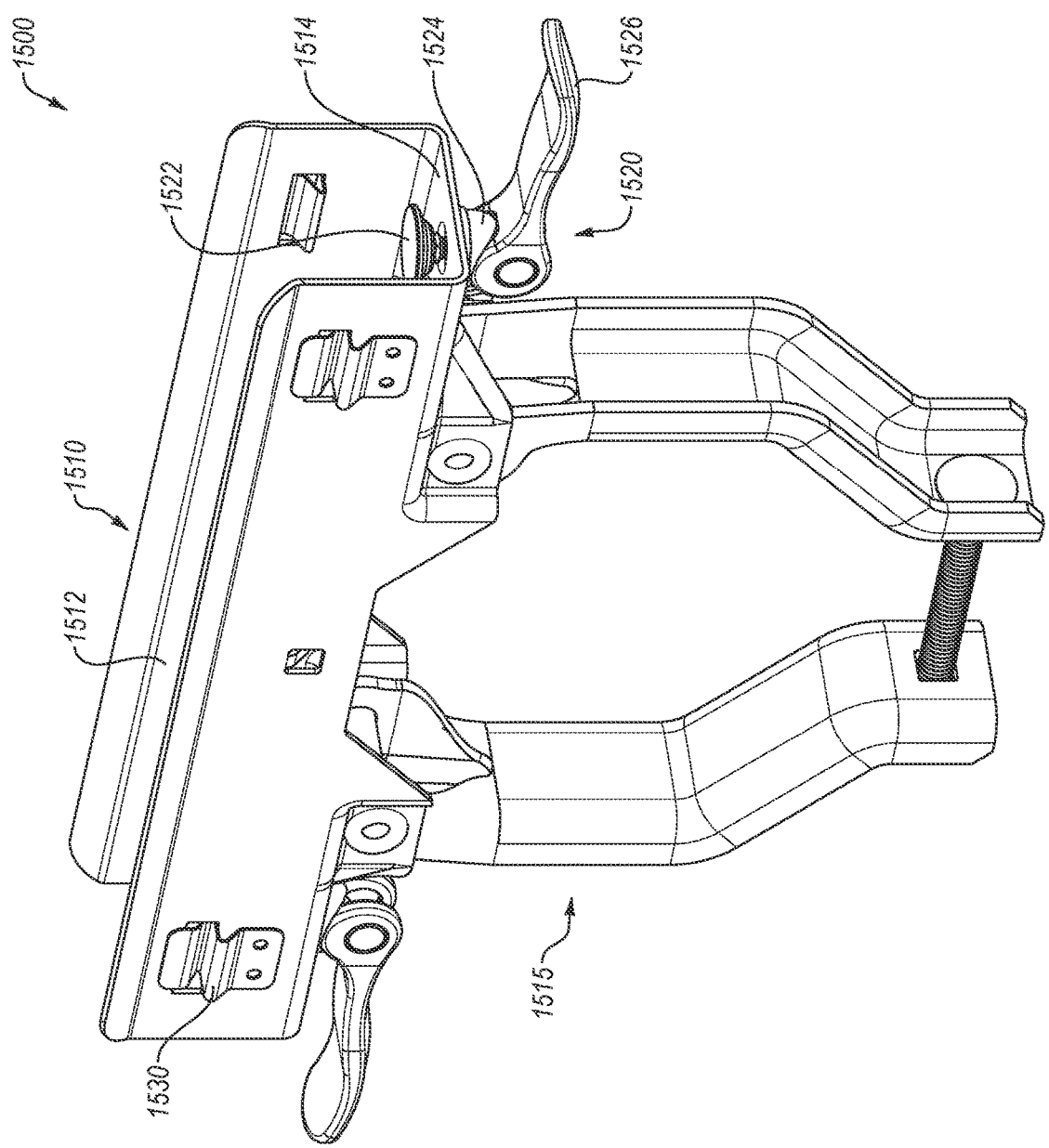
FIG. 15 is an isometric view of a twelfth example embodiment of the module clamp according to at least one embodiment of the present disclosure.

FIG. 15 is an isometric view of a module clamp 1500 according to at least one embodiment of the present disclosure. The module clamp 1500 may include a clamp body 1515 and/or a seating portion 1510 that are the same as or similar to the clamp bodies and/or seating portions of other embodiments of the snap-lock PV module mounting systems described in relation to, for example, FIGS. 3A-3C, 4A-4C, 5A-5E, 6, and/or 12A-12B. For example, the seating portion 1510 of the module clamp 1500 may include lateral walls 1512 and a base surface 1514.

The seating portion may include one or more pop-out tabs 1530 that may be fastening features similar or comparable in function to the pop-out tabs of FIGS. 12A-12B. However, the pop-out tabs 1530 may be made of a different material or as a separate component from the lateral walls 1512. For example, the pop-out tabs 1530 may be made of a rigid plastic or a spring metal and may be riveted, welded, melted, adhered, bolted, or otherwise fixedly attached to the lateral walls 1512.

In some embodiments, the module clamp 1500 may include one or more pressure pads 1520 that protrude from the base surface 1514, and a module rail positioned within the seating portion 1510 may be seated on the pressure pads 1520 with a gap between the module rail and the base surface 1514. The pressure pads 1520 may provide a spring force that opposes the module rail seated on the pressure pads 1520 within the seating portion 1510.

In these and other embodiments, each of the pressure pads 1520 may include a pad component 1522 connected to a screw or other body component 1524 that is coupled to a cam lever 1526, and a height of the pressure pads 1520 may be adjusted by a cam lever 1526 coupled to the pressure pads 1520. Rotating the cam lever 1526 may adjust a length of the body component 1524 above the base surface 1514, which corresponds to a height of the pressure pad 1520 above the base surface 1514. Additionally or alternatively, one end of the body component 1524 may include an adjustable knob, such as a screwhead, that may be adjusted to change the length of the body component 1524 above the base surface 1514 in tandem with or independent of rotation of the cam lever 1526. Although illustrated and described as a pad component 1522, the pressure pads 1520 may include a set screw, a knob, a spring, or any other component in addition to or as a substitute for the pad component 1522 to provide the opposing force against the module rail positioned on top of the pressure pads 1520.

As with the extended tab 1420 of FIG. 14A, the pressure pad 1520 of FIG. 15 may press the module rail against the pop-out tabs 1530 as the fastening feature. For example, the pressure pad may have the cam lever 1526 released when pressing the module rail into the seating portion 1510 such that openings of the module rail align with the pop-out tabs 1530. After being positioned, the cam levers 1526 may be engaged, forcing the module rail upwards and against the pop-out tabs 1530, locking the module rail and the seating portion 1510 in a more secure connection relative to each other to avoid or prevent sliding, rattling, or movement between the two components.

Figure 16B:
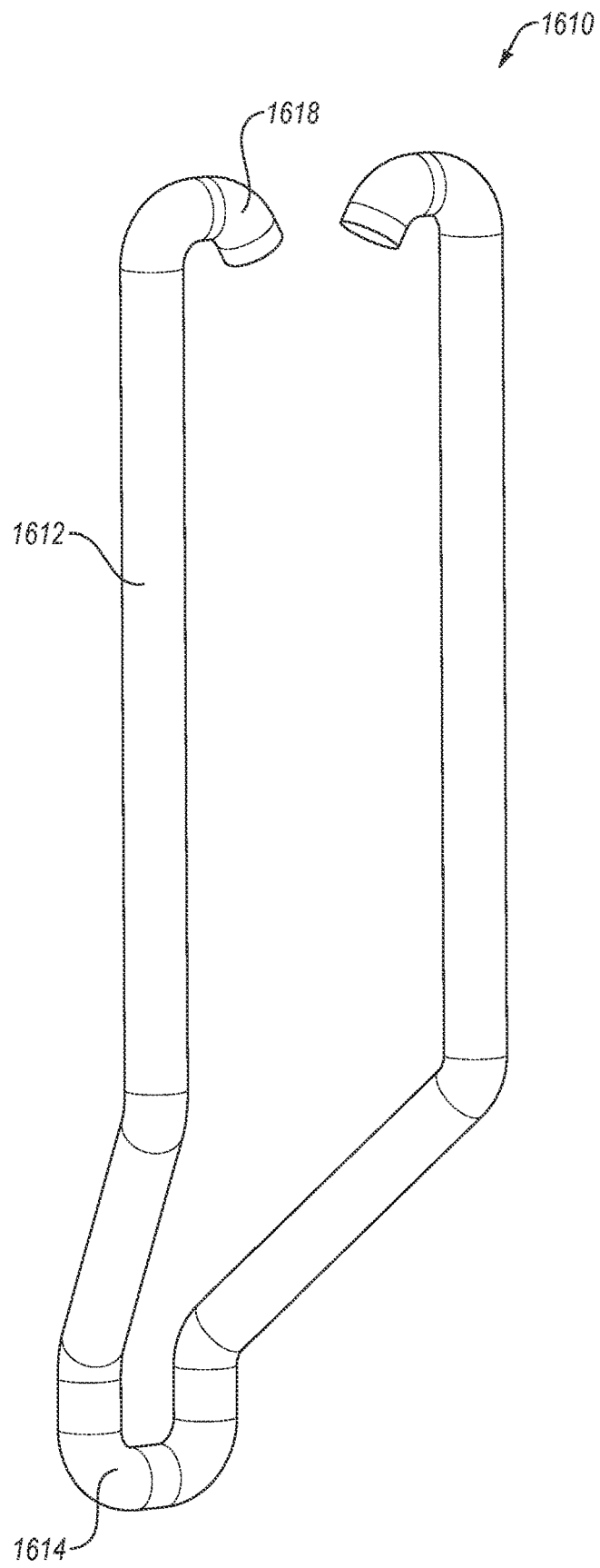
FIG. 16B illustrates a wire form clamp body of the thirteenth embodiment of the module clamp according to at least one embodiment of the present disclosure.

FIGS. 16A-16C illustrate various views of a module clamp 1600 that couples to a torque tube 1630 via one or more wire module clamps 1610 according to at least one embodiment of the present disclosure. The module clamp 1600 may include one or more wire module clamps 1610 that fasten the torque tube 1630 to a module rail 1620. In some embodiments, the wire module clamps 1610 may be fastening features made of one or more wire frames 1612 that connect hooks 1618 to a fastening loop 1614. The wire frames 1612, the hooks 1618, and/or the fastening loop 1614 may include angles or a series of portions that are shaped to interface with a profile of the torque tube 1630.

In these and other embodiments, two or more wire module clamps 1610 may be positioned on opposite sides of the torque tube 1630 so that the hooks 1618 may interface with one or more openings and/or or holes along opposite sides of the module railing, and a bolt, screw, or any other fastener may be inserted through the fastening loops 1614 of each of the wire module clamps 1610 to force the wire module clamps 1610 against the torque tube 1630 and the torque tube 1630 against the module rail. For example, a pair of such wire frames 1612 may be used with one on either side of the torque tube 1630 and a bolt 1616 may connect the two along the bottom of the torque tube 1630. In this and other examples, the bolt 1616 may be tightened to pinch the wire frames 1612 together to provide a stronger locking force between the module rail, module clamp 1600, and/or the torque tube 1630.

The wire frames 1612 may be attached to the module rail 1620 prior to installation and prior to shipping such that when an installer arrives to install a PV tracking system, the PV module rails may already include the wire frames 1612 attached thereto without taking much, if any, additional space in shipping or packaging. Additionally or alternatively, the wire frames 1612 may be attached to the module rail on-site during installation.

In installation, the wire frames 1612 may be attached to the module rail 1620 (whether in the factory during manufacturing or in the field) and the module rail 1620 and corresponding PV modules may be placed on the torque tube. The wire frames 1612 may be placed in proximity to each other (effectively pinching the torque tube between the two wire frame 1612 components), and the bolt 1616 may be tightened between the two wire frames 1612, locking the module rail 1620 in position relative to the torque tube.

In some embodiments, the height/profile of the wire frames 1612 may be the same or smaller in profile than the module rail 1620. In these and other embodiments, the wire frames 1612 may be attached to the module rail 1620 and may rotate back in place or forward in place against the back of the PV module(s) such that the wire frames 1612 may be lower than the module rail 1620. In these and other embodiments, stacking and/or shipping module rail 1620 and PV modules may or may not require additional space when shipping the module rail 1620/PV modules to a site for installation with the wire frames 1612 already installed on the module rail 1620.

Figure 17:
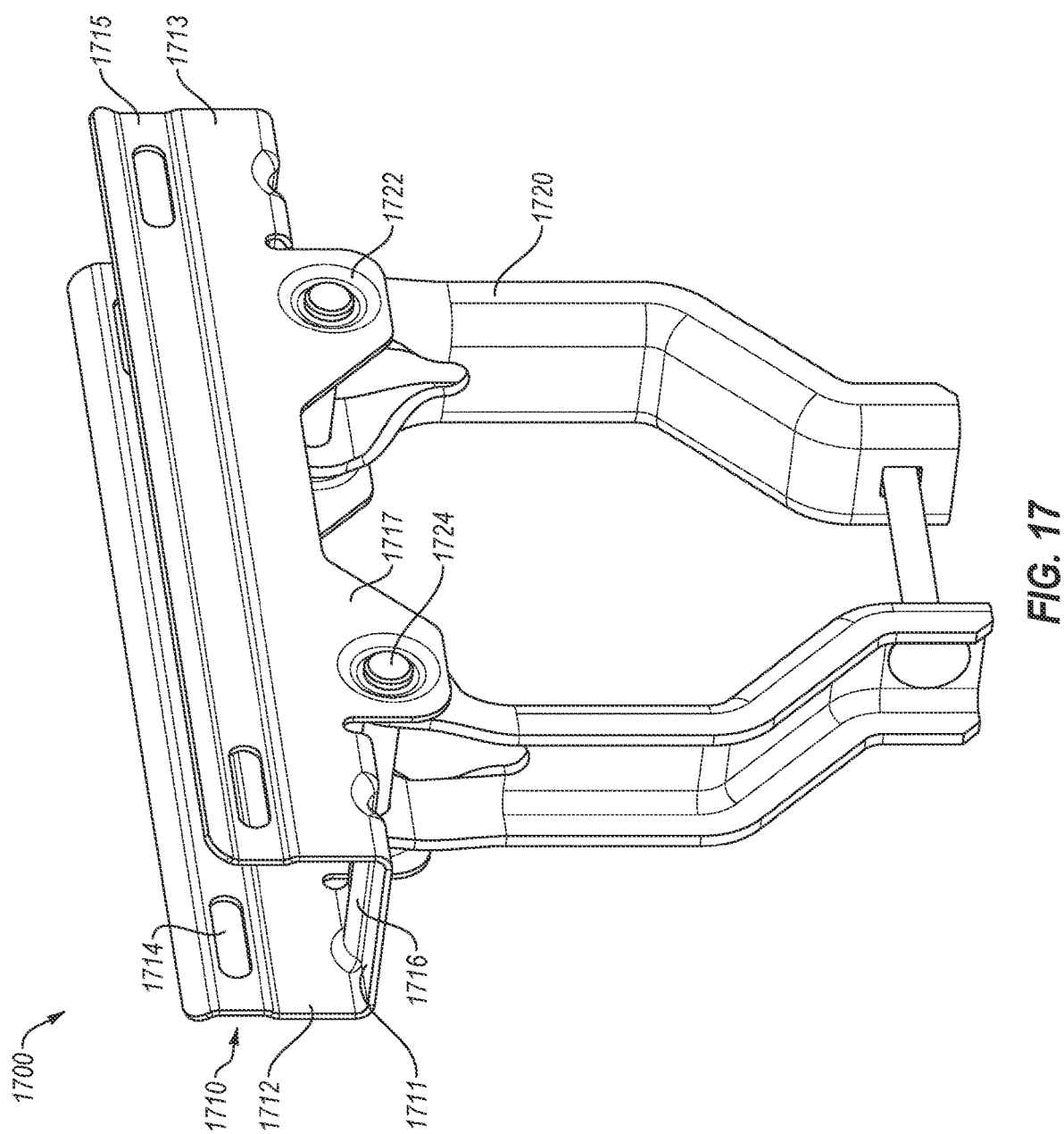
FIG. 17 illustrates a perspective view of an example module clamp according to at least one embodiment of the present disclosure.
Figure 18:
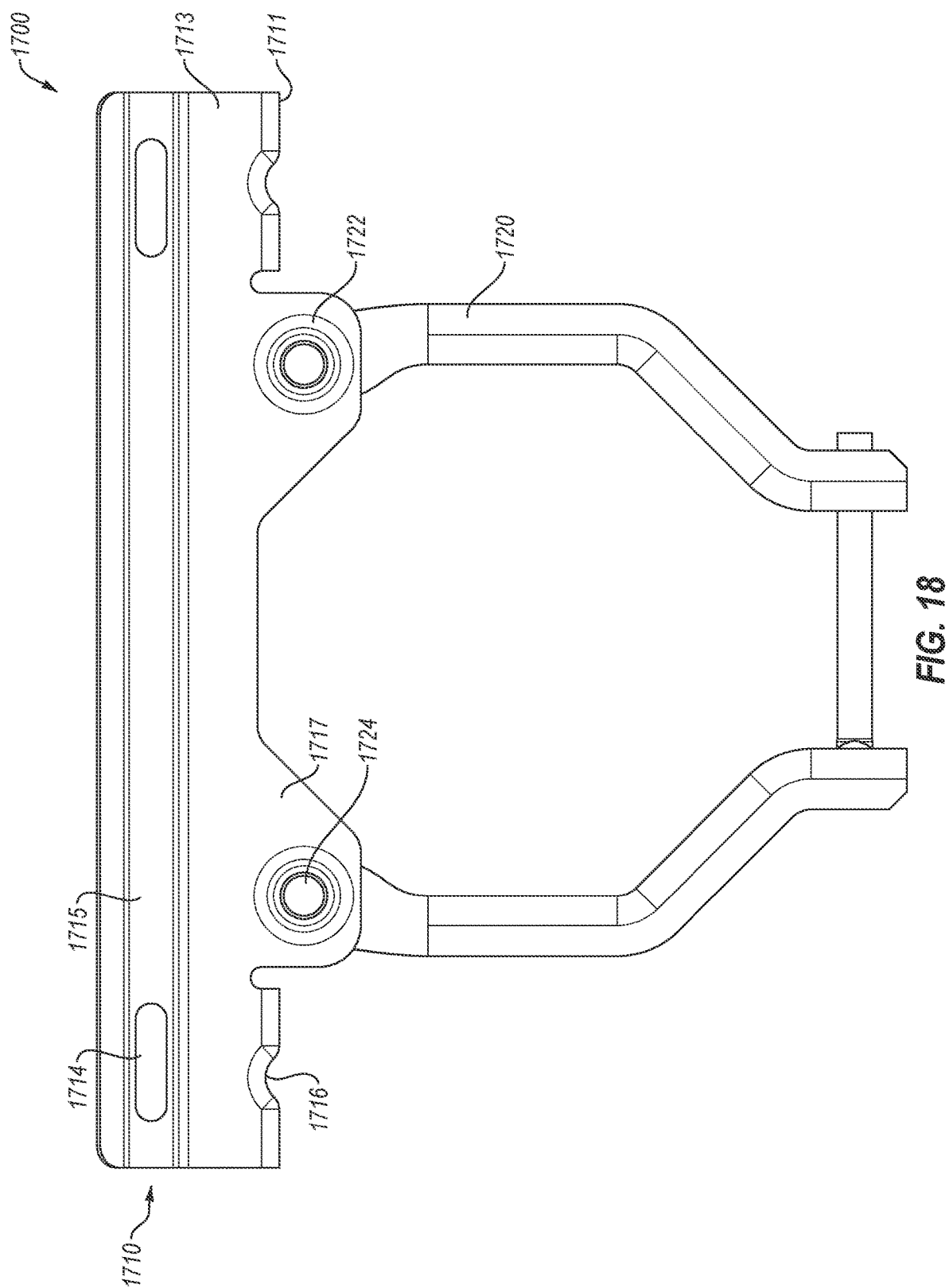
FIG. 18 illustrates a front view of the module clamp of FIG. 17 according to at least one embodiment of the present disclosure.
Figure 19:
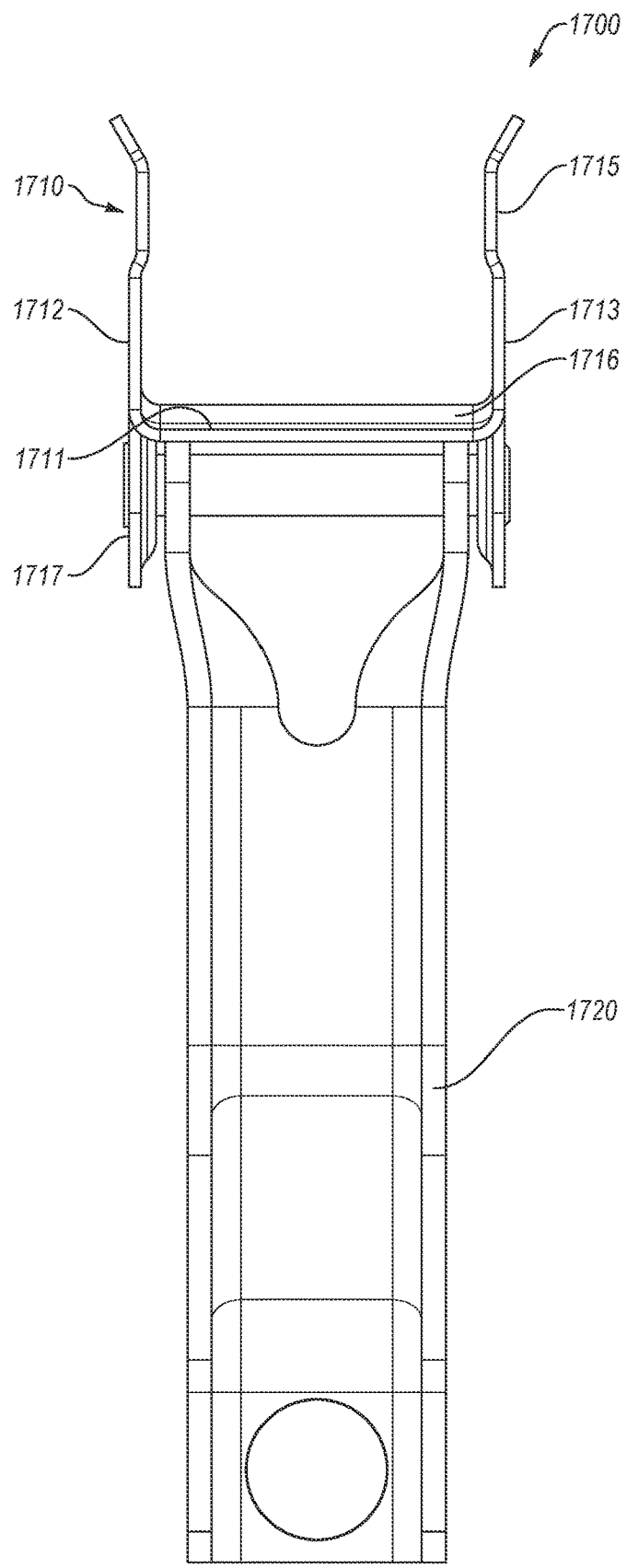
FIG. 19 illustrates a side view of the module clamp of FIG. 17 according to at least one embodiment of the present disclosure.

FIG. 17 illustrates a perspective view of a module clamp 1700 according to at least one embodiment of the present disclosure. FIG. 18 and FIG. 19 respectively illustrate a front view and a side view of the module clamp 1700. The module clamp 1700 may include a seating portion 1710 in which a module rail (not shown) of a photovoltaic (PV) module may be placed. The seating portion 1710 may include a shape that complements a shape (e.g., a cross-sectional profile) of the module rail. For example, the seating portion 1710 may include a base surface 1711, a first wall 1712, and a second wall 1713 as illustrated in FIG. 17 to accommodate a module rail that includes a rectangular or a substantially rectangular cross-sectional profile. In these and other embodiments, the seating portion 1710 may include a different shape that corresponds to a module rail that includes a different cross-sectional profile. For example, an interface between the base surface 1711 and the first wall 1712 may be a curved or rounded corner rather than a perpendicular or substantially perpendicular corner to accommodate a module rail that includes a rectangular cross-section with rounded corners rather than perpendicular corners.

In some embodiments, the first wall 1712 and/or second wall 1713 may include one or more slots 1714. Each of the slots 1714 may be aligned with an opening in the module rail or some other component of the PV module support structure through which a bolt, a nut, a screw, or any other fastener may be inserted to couple the module clamp 1700 to the module rail or the other component of the PV module support structure.

In some embodiments, the portion of the first wall 1712 and/or the second wall 1713 in which the slots 1714 are located may be offset from the rest of the first wall 1712 and/or the second wall 1713 by jog features 1715. The jog features 1715 may be an indented portion of the first wall 1712 and/or the second wall 1713 that is offset from the rest of the first wall and/or the second wall 1713. By positioning the slots 1714 along the surfaces of the first wall 1712 and/or the second wall 1713 that are offset by the jog features 1715, the slots 1714 may be better aligned with openings included in the module rail or other components of the PV module support structure (collectively referred to herein as "component of the PV module support structure"). Additionally or alternatively, the jog features 1715 may provide a compressive force that reduces stress on other aspects of the component of the PV module support structure by redistributing the weight force of a PV module mounted on the PV module support structure. Additionally or alternatively, the jog features 1715 may provide a consistent position at which the first wall 1712 and the second wall 1713 may physically contact the module rail while preventing any play between the first wall 1712 and the second wall 1713 and the module rail. For example, because of the inward direction of the jog features 1715, a compressive force may be applied against the module rail, and the module rail may slightly displace one or both of the first wall 1712 and the second wall 1713 at the jog feature when being inserted into the seating portion 1710.

In some embodiments, the base surface 1711 may include a ridge 1716 that protrudes above the rest of the base surface 1711. The component of the PV module support structure that is positioned in the seating portion 1710 of the module clamp 1700 may rest on the ridge 1716 before or after coupling together the module clamp 1700 and the component of the PV module support structure via fasteners through the slots 1714. In these and other embodiments, the height of the ridge 1716 may facilitate alignment of the slots 1714 with openings included in other components of the PV module support structure. The ridge 1716 may additionally or alternatively provide a spring force against the weight of the component of the PV module support structure that is positioned in the seating portion 1710.

In some embodiments, the component of the PV module support structure may be lifted off of the ridge 1716 and the rest of the base surface 1711 after coupling together the module clamp 1700 and the component of the PV module support structure via fasteners through the slots 1714. The component of the PV module support may initially rest on the ridge 1716 and be lifted off of the ridge 1716 after inserting one or more fasteners through the slots 1714 such that the component of the PV module support structure does not interface with the ridge 1716 or the base surface 1711 at all after installation. In these and other embodiments, the jog features 1715 may provide a lateral compressive force that stabilizes and fixes the component of the PV module support structure in place and distributes the weight force of the component of the PV module support structure along the slots 1714 and/or the fasteners within the slots 1714, rather than on the ridge 1716 and/or the base surface 1711.

The second wall 1713 may include a tab 1717 that extends below the base surface 1716. The tab 1717 includes a bottom surface that, at least in part, is shaped to interface with a torque tube. The module clamp 1700 may be coupled to a torque tube band 1720. The module clamp 1700 may include one or more openings (not shown in FIGS. 17-19; illustrated as holes 1838 in FIGS. 20C and 20D) through which fasteners 1724 may be inserted to couple the module clamp 1700 to the torque tube band 1720. In some embodiments, the module clamp 1700 may include indentations 1722 that are depressed portions along the first wall 1712 and/or the second wall 1713 around the positions of the openings. The indentations 1722 may provide clearance for the fasteners 1724 used to couple the module clamp 1700 to the torque tube band 1720 so that the fasteners 1724 may be inserted to not protrude from beyond the first wall 1712 and/or the second wall 1713. Additionally or alternatively, the indentations 1722 may provide a pivot point for making adjustments to the orientation of the torque tube band 1720. The fasteners 1724 may include any component that facilitates rotation of the torque tube band 1720 about the torque tube (not illustrated), such as a rivet.

Figure 20A:
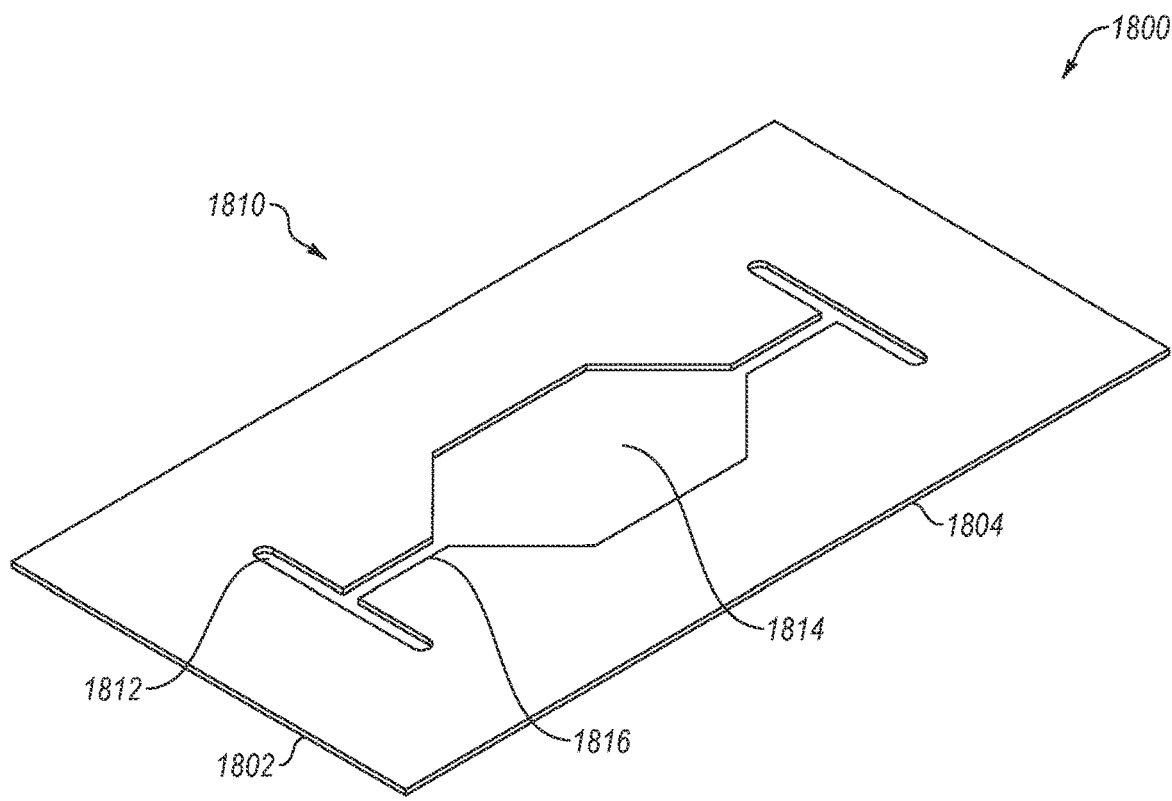
FIGS. 20A-20D illustrate a step-by-step fabrication process for manufacturing a module clamp according to at least one embodiment of the present disclosure.

FIGS. 20A-20D illustrate a step-by-step fabrication process 1800 for a module clamp 1840 according to at least one embodiment of the present disclosure. The module clamp 1840 may be the same as or similar to the module clamp 1700 depicted in FIGS. 17-19. In some embodiments, the fabrication process 1800 may be a stamping process that may be continuously applied to patterned sheets of metal such that the module clamp 1840 may be efficiently fabricated in high volumes in an assembly line process. Additionally or alternatively, the fabrication process 1800 may include an assembly-line-style cutting process to form sheets of metal having a pattern 1810 as illustrated in FIG. 20A.

The fabrication process 1800 may begin with forming the patterned sheet of metal 1810 as illustrated in FIG. 20A. Before forming the patterned sheet 1810, a sheet of metal may include a rectangular or substantially rectangular shape with two first sides 1802 and two second sides 1804 in which each of the second sides 1804 is longer than each of the first sides 1802. In some embodiments, the patterned sheet 1810 may include two width-wise slits 1812 and a hole 1814 in the center of the patterned sheet 1810 in which each of the width-wise slits 1812 is connected to the hole 1814 by a length-wise slit 1816. Each of the length-wise slits 1816 may extend from a midpoint of each of the width-wise slits 1812 such that the length-wise slits 1816 are perpendicular to the width-wise slits 1812. In these and other embodiments, each of the length-wise slits 1816 may extend from the midpoint of each of the width-wise slits 1812 such that the length-wise slits 1816 do not substantially extend past or extend past at all the two width-wise slits. In these and other embodiments, the hole 1814 may include a shape that corresponds to a cross-sectional shape of a torque tube such that the hole 1814 can accommodate the torque tube after being formed into the module clamp 1840. For example, a given torque tube may be a tube with an octagonal or a hexagonal cross-section, and the patterned sheet 1810 may include a hexagonal shape as illustrated in FIG. 20A such that each half of the hole 1814 corresponds to the top three faces of the given torque tube. As another example, a given torque tube may include a rectangular or diamond-shaped cross-section, and the hole 1814 of the patterned sheet 1810 may include a corresponding face or faces shaped to interface with the top face or faces of the rectangular or diamond shape. Additionally or alternatively, any other shaped torque tube is contemplated, such as circular, triangular, or other shaped cross-sections.

Although the patterned sheet 810 is described above as being made of metal, the patterned sheet 810 may additionally or alternatively be made of plastic (e.g., a polymeric compound) or any other materials (e.g., carbon fiber) via a thermoforming, an injection molding, or any other plastic-shaping process.

In these and other embodiments, the patterned sheet of metal 1810 may be made of any metals that may be folded, stamped, cut, bent, or otherwise modified to form the patterned sheet 1810. For example, the patterned sheet 1810 may be made of cast iron, stainless steel, or aluminum. The metal used for the patterned sheet 1810 may additionally or alternatively be resistant to corrosion and/or damage during operation of a PV module support structure (e.g., over several years of tilting PV modules) in which case the patterned sheet 1810 may be made of galvanized steel.

Figure 20B:
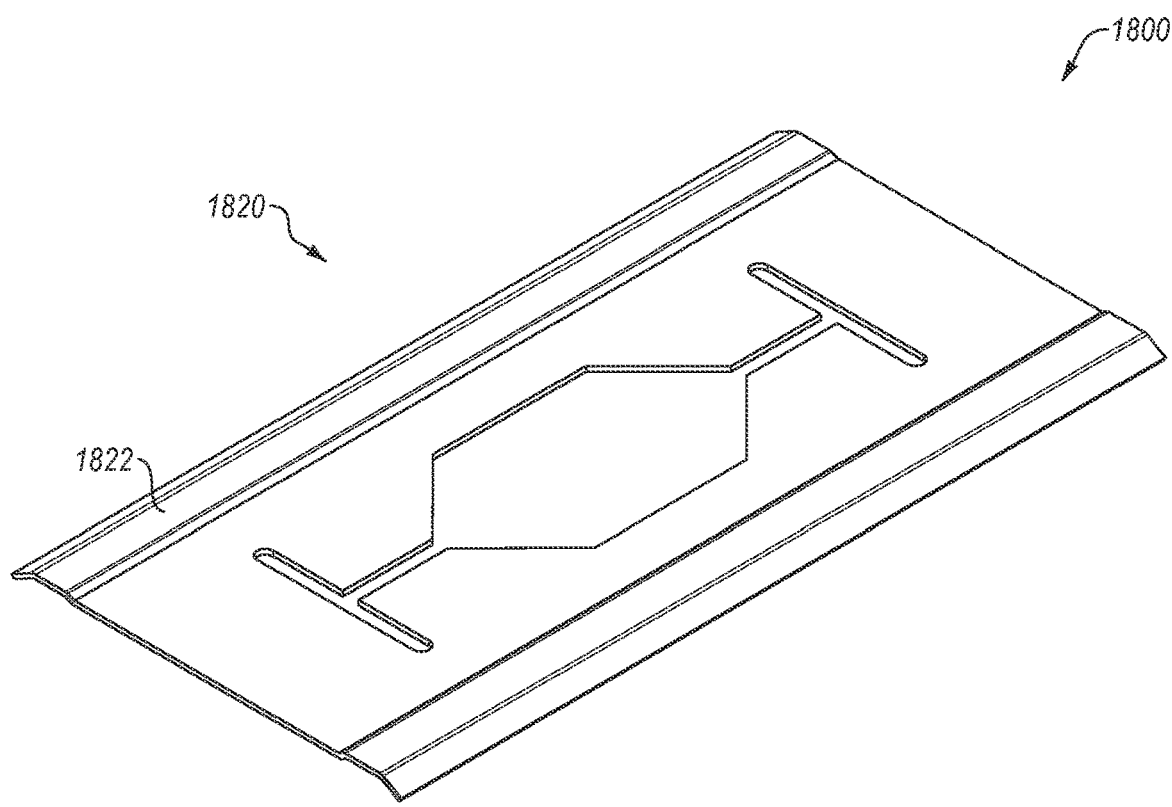

As illustrated in FIG. 20B, a stamped sheet of metal 1820 may be formed from the patterned sheet 1810. In some embodiments, various features may be stamped onto the patterned sheet 1810. The stamped features may include any features, such as jog features 1822 as illustrated in FIG. 20B, that may be indented, stamped, or otherwise added to the patterned sheet 1810. In these and other embodiments, the stamping of the features onto the patterned sheet 1810 may involve a preliminary stamping process. For example, the patterned sheet 1810 may be placed on a stamping block that includes protruding features corresponding to the jog features and stamped to form the jog features on the patterned sheet 1810.

Figure 20C:
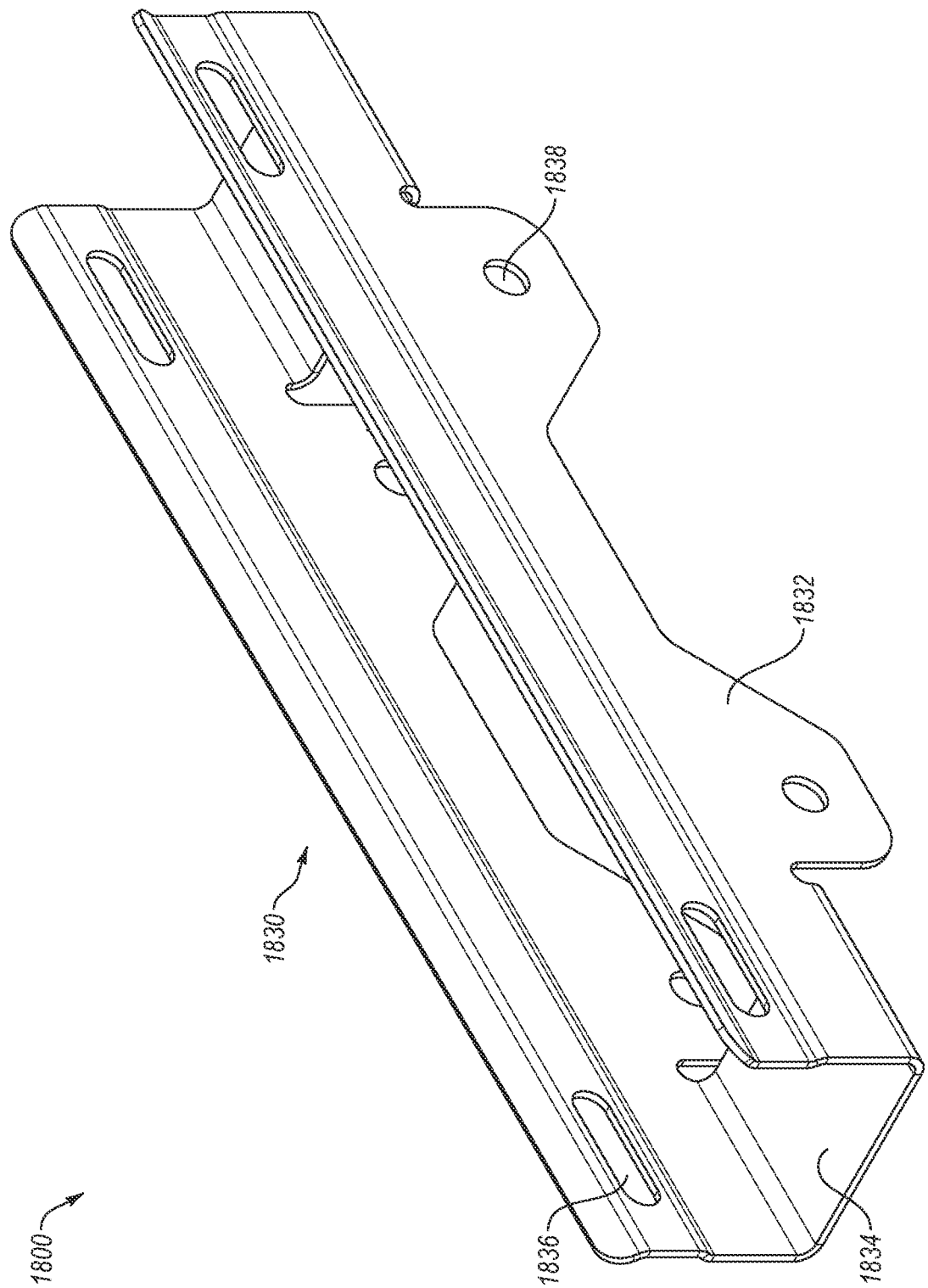

As illustrated in FIG. 20C, the stamped sheet of metal 1820 may be folded to form a preliminary module clamp 1830. In some embodiments, the stamped sheet 1820 may be folded along length-wise lines 1824 and 1826 at the ends of the width-wise slits 1812 such that tabs 1832 having a shape corresponding to the hole 1814 are formed in plane with the jog features 1822. To fold the stamped sheet 1820, a stamping process may be used in which the stamped sheet 1820 is placed on a stamping block shaped like seating portion 1834 of the preliminary module clamp 1830 and stamped to fold the stamped sheet 1820 around the stamping block to form the shape illustrated in FIG. 20C. Additionally or alternatively, any other method of forming a bend a metal sheet to form the shape illustrated in FIG. 20C may be used with the stamped sheet 1820. For example, wiping, pivot bending, V-bending, and any other processes of forming bends in a sheet of metal may be used.

In these and other embodiments, one or more cutout features 1836 may be added to the preliminary module clamp 1830 before, during, or after the stamping process. The cutout features 1836 may include slots, such as the slots 1714 as illustrated in FIGS. 17-19, and/or holes 1838 for facilitating attachment of the preliminary module clamp 1830 to a torque clamp band, such as the torque tube band 1720 as illustrated in FIGS. 17-19. The cutout features 1836 and/or the holes 1838 (collectively referred to herein as "the cutout features 1836") may be formed by punching out the forms of the cutout features 1836, such as by using a punch press. Additionally or alternatively, the cutout features 1836 may be formed simultaneously during the stamping process, such as by including protrusions on the stamping block to facilitate forming the cutout features 1836 during stamping of the stamped sheet 1820.

Figure 20D:
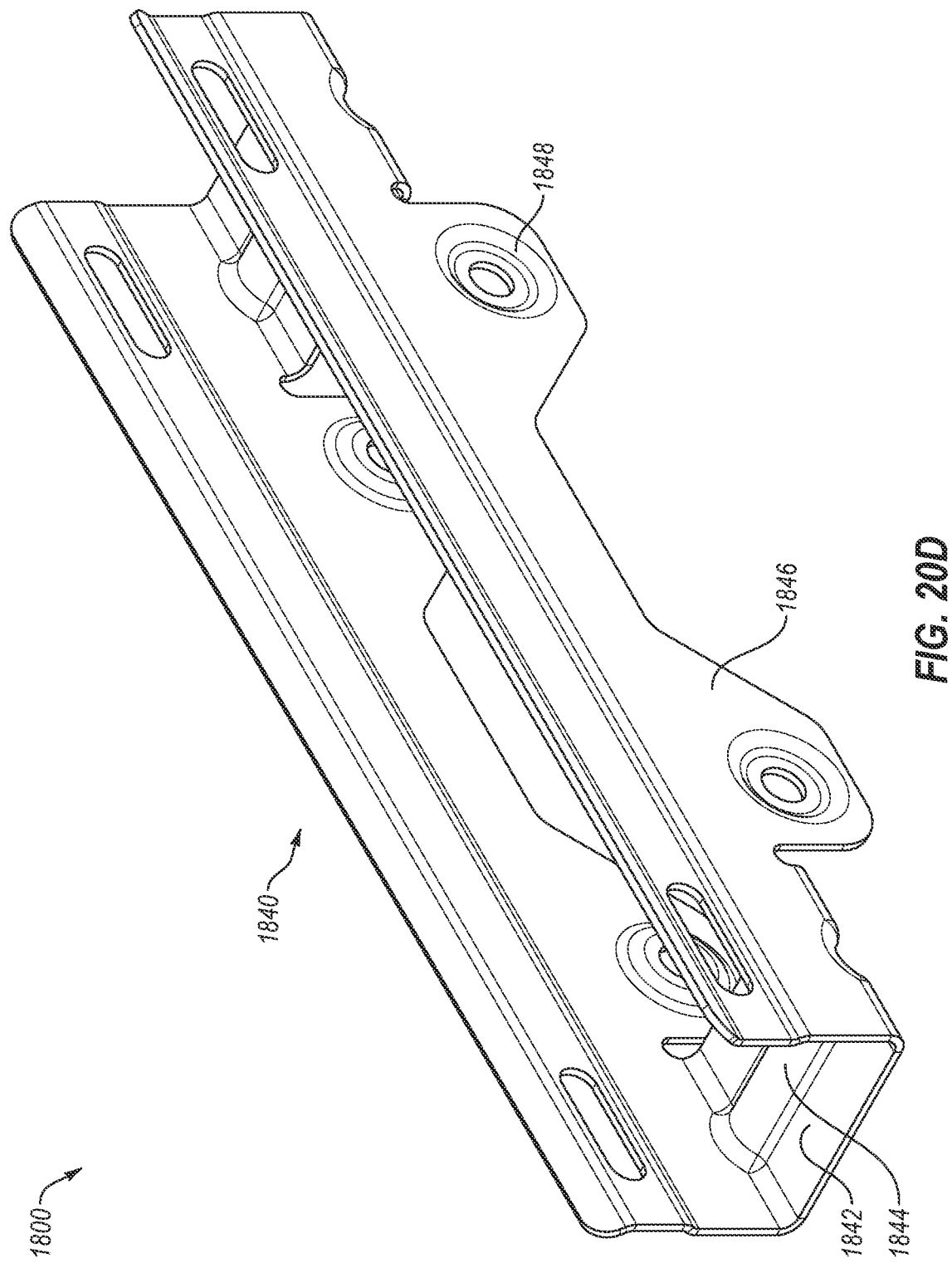

One or more features, such as ridges 1844 along a base surface 1842 and/or indentations 1848 along tabs 1846 of a module clamp 1840 as illustrated in FIG. 20D, may be added to the preliminary module clamp 1830 to form the module clamp 1840 in which the ridges 1844 may be the same as or similar to the ridges 1716, and/or the indentations 1848 may be the same as or similar to the indentations 1722 as described in relation to FIGS. 17-19. In some embodiments, forming the ridges 1844 and/or the indentations 1848 may involve an additional stamping process. For example, a stamping block that includes protruding and/or indented features corresponding to the ridges 1844 and/or the indentations 1848, respectively, may be placed flush underneath the base surface 1842 of the module clamp 1840 and against the tabs 1846. Applying force against the base surface 1842 and the tabs 1846 may facilitate formation of the ridges 1844 and/or the indentations 1848. Additionally or alternatively, the ridges 1844 and/or the indentations 1848 may be formed individually by a press machine rather than by a stamping process.

Figure 21:
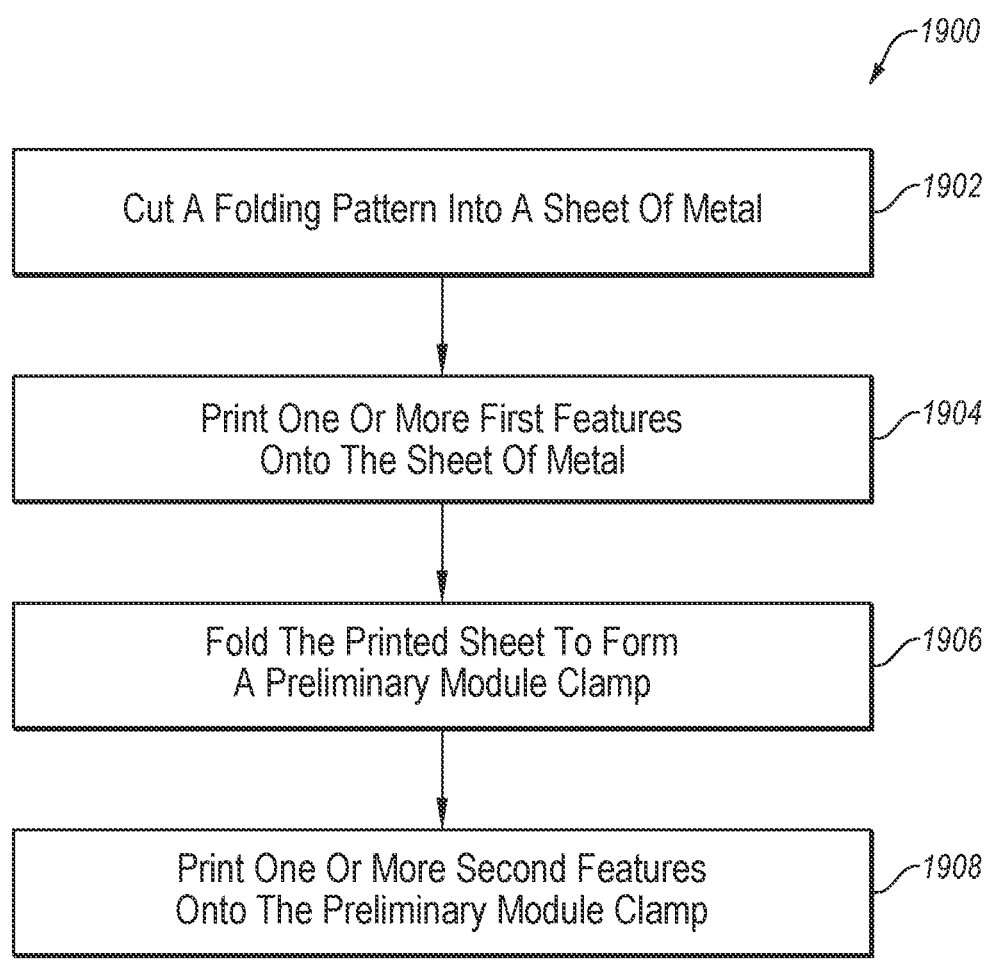
FIG. 21 is a flowchart of an example method of fabricating the module clamp illustrated in FIG. 17 according to at least one embodiment of the present disclosure.

FIG. 21 is a flowchart of an example method 1900 of fabricating the module clamp according to at least one embodiment of the present disclosure. The method 1900 may be performed by any suitable system. For example, the patterned sheet 1810, the stamped sheet 1820, the preliminary module clamp 1830, and/or the module clamp 1840 may be involved with one or more operations associated with the method 1900. Although illustrated with discrete blocks, the steps and operations associated with one or more of the blocks of the method 1900 may be divided into additional blocks, combined into fewer blocks, or eliminated, depending on the particular implementation.

The method 1900 may begin at block 1902, where an initial folding pattern may be cut into a sheet of metal. The initial folding pattern may include one or more width-wise slits relative to the sheet of metal, one or more length-wise slits relative to the sheet of metal, and a hole as shown in relation to the fabrication process 1800 with the width-wise slits 1812, the length-wise slits 1816, and the hole 1814. In some embodiments the width-wise slits 1812 may be at either end of the length-wise slit 1816, and the hole 1814 may be centered on the length-wise slit 1816.

At block 1904, one or more first features may be stamped onto the sheet of metal to form a stamped sheet. In some embodiments, the first features may include the jog features, such as the jog features 1822 or the jog features 1715 described in relation to FIG. 20B and FIGS. 17-19, respectively. Stamping the first features onto the sheet of metal may involve a stamping process in which the sheet of metal is placed against a stamping block or other template and the first features are stamped or otherwise impressed into the sheet of metal. The jog features 1715 may extend the entire length of the sheet of metal and parallel to the length-wise slit 1816. Additionally or alternatively, the jog features 1715 may begin at the edge of the sheet of metal and may end in the width-wise direction before the jog features 1715 reach the width-wise slits 1812.

At block 1906, the stamped sheet may be folded along a line extending parallel to the length-wise slit 1816 and at the end of the width-wise slits 1812, such as the lines 1824 and 1826 as illustrated in FIG. 20B, to form a preliminary module clamp. For example, the stamped sheet may be folded as depicted in FIGS. 20B and 20C. Additionally or alternatively, folding the stamped sheet may include punching one or more slots through the stamped sheet before, during, or after the folding process. As an example of punching the slots through the stamped sheet during the folding process, a stamping block used for folding the stamped sheet may include one or more protrusions that facilitate forming the slots as the stamped sheet is folded over the stamping block during a stamping process.

At block 1908, one or more second features may be stamped onto the preliminary module clamp to form the module clamp. In some embodiments, the second features may include ridges, such as the ridges 1716 or the ridges 1844, or indentations, such as the indentations 1722 or the indentations 1848, as described in relation to FIGS. 17-19 or FIGS. 20A-20D, respectively.

Modifications, additions, or omissions may be made to the method 1900 without departing from the scope of the disclosure. For example, the designations of different elements in the manner described is meant to help explain concepts described herein and is not limiting. Further, the method 1900 may include any number of other elements or may be implemented within other systems or contexts than those described.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A module clamp, comprising:
    a seating portion including a first wall, a second wall, and a base surface, wherein the base surface connects the first wall to the second wall to create a U-shaped channel, and wherein the base surface includes a hole in the middle of the base surface;
    a first jog feature in the first wall that offsets a portion of the first wall from the rest of the first wall;
    a second jog feature in the second wall that offsets a portion of the second wall from the rest of the second wall, wherein one or more slots are included along the first jog feature and the second jog feature;
    a first tab that extends below the first wall, wherein the first tab includes a first bottom surface that is shaped to interface at least in part with a torque tube; and
    a second tab that extends below the second wall, wherein the second tab includes a second bottom surface that is shaped to interface at least in part with the torque tube.

2. The module clamp of claim 1, wherein the base surface includes one or more ridges between the first wall and the second wall.

3. The module clamp of claim 1, wherein the first tab and the second tab each include one or more holes, each of the holes being configured for insertion of a fastener to couple the module clamp to a torque tube band to circumscribe the torque tube.

4. The module clamp of claim 3, wherein the holes of the first tab and the second tab each include an indentation circumscribing each of the holes.

5. A photovoltaic module support structure, comprising:
    a module clamp, comprising:
        a seating portion including a first wall, a second wall, and a base surface, wherein the base surface connects the first wall to the second wall to create a U-shaped channel, and wherein the base surface includes a hole in the middle of the base surface;
        a first jog feature in the first wall that offsets a portion of the first wall from the rest of the first wall;
        a second jog feature in the second wall that offsets a portion of the second wall from the rest of the second wall;
        a first tab that extends below the first wall;
        a second tab that extends below the second wall;
    a torque tube band coupled to the module clamp via the first tab and the second tab; and
    a torque tube coupled to the torque tube band, the torque tube having a cross-sectional shape corresponding to a shape defined, at least in part, by the torque tube band, the first tab, and the second tab.

6. The photovoltaic module support structure of claim 5, wherein the base surface of the module clamp includes one or more ridges between the first wall and the second wall.

7. The photovoltaic module support structure of claim 5, wherein the first tab and the second tab of the module clamp each include one or more holes, each of the holes being configured for insertion of a fastener to couple the module clamp to the torque tube band.

8. The photovoltaic module support structure of claim 7, wherein the holes of the first tab and the second tab each include an indentation circumscribing each of the holes.

9. A photovoltaic module support structure, comprising:
    a module clamp, comprising:
        a first wall that includes a first jog feature that offsets a portion of the first wall from the rest of the first wall, wherein one or more slots are included along the first jog feature and the first wall includes a first tab extending below a base surface of the module clamp;
        a second wall that includes a second jog feature that offsets a portion of the second wall from the rest of the second wall, wherein one or more slots are included along the second jog feature and the second wall includes a second tab extending below the base surface of the module clamp;
        the base surface connecting the first wall and the second wall, the base surface including a hole in the middle of the base surface;
    a torque tube band coupled to the module clamp via the first tab and the second tab; and
    a torque tube coupled to the torque tube band, the torque tube having a cross-sectional shape corresponding to a shape defined, at least in part, by the torque tube band, the first tab, and the second tab,
    wherein, a module rail corresponding to a photovoltaic module that is coupled to the photovoltaic module support structure via a fastener disposed in each of the one or more slots along the first jog feature and the second jog feature is configured to be positioned between the first wall and the second wall of the module clamp without contacting the base surface of the module clamp.

10. The module clamp of claim 1, wherein the hole in the middle of the base surface extends from the first wall to the second wall.

11. The photovoltaic module support structure of claim 5, wherein the hole in the middle of the base surface extends from the first wall to the second wall.

12. A module clamp, comprising:
    a seating portion including a first wall, a second wall, and a base surface, wherein the base surface connects the first wall to the second wall to create a U-shaped channel, and wherein the base surface includes a hole in the middle of the base surface that extends from the first wall to the second wall;
    a first jog feature in the first wall that offsets a portion of the first wall from the rest of the first wall;
    a second jog feature in the second wall that offsets a portion of the second wall from the rest of the second wall;
    a first tab that extends below the first wall, wherein the first tab includes a first bottom surface that is shaped to interface at least in part with a torque tube; and
    a second tab that extends below the second wall, wherein the second tab includes a second bottom surface that is shaped to interface at least in part with the torque tube.

13. The module clamp of claim 12, wherein the base surface includes one or more ridges between the first wall and the second wall.

14. The module clamp of claim 12, wherein the first tab and the second tab each include one or more holes, each of the holes being configured for insertion of a fastener to couple the module clamp to a torque tube band to circumscribe the torque tube.

15. The module clamp of claim 14, wherein the holes of the first tab and the second tab each include an indentation circumscribing each of the holes.

16. The module clamp of claim 12, wherein one or more slots are included along the first jog feature and the second jog feature.

* * * * *